PHOTOCOMPOSING MACHINE

Original Filed March 13, 1953 12 Sheets-Sheet 1

INVENTORS
L. ROSSETTO
G. SQUASSONI
E. COLEMAN
W. S. GORRILL

By Morrison Kennedy & Campbell ATTORNEYS

PHOTOCOMPOSING MACHINE

Original Filed March 13, 1953 12 Sheets-Sheet 2

INVENTORS
L. ROSSETTO
G. SQUASSONI
E. COLEMAN
W. S. GORRILL

By Morin, Kennedy, Campbell ATTORNEYS

Fig. 1B.

Five word line - 4 minimum spaces. 26 Electronic impulses from photocell to divider through pickoff gate.

4)26 (6+2 Extra Electronic Spaces

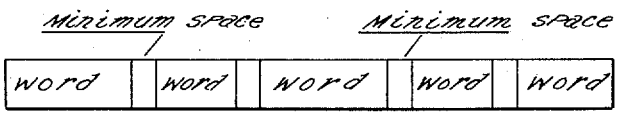

Before Justification

Fig. 1C.

Justified line without the 2 Extra Electronic spaces. Impulses to divider and thence to Justification storage and Decoder tree.

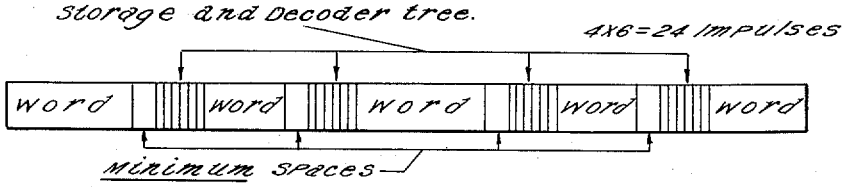

Fig. 1D.

Fully Justified Line

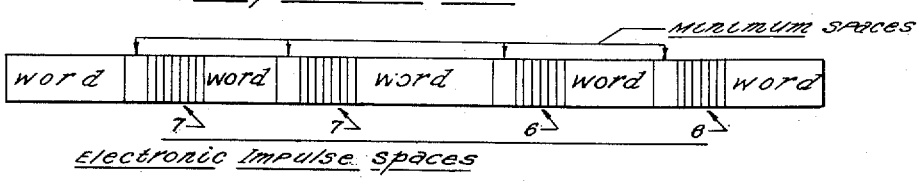

2x6 = 12
2x7 = 14
12+14=26 impulses

INVENTORS
L ROSSETTO
G SQUASSONI
E COLEMAN
W S GORRILL

By Morrison Kennedy & Campbell ATTORNEYS

PHOTOCOMPOSING MACHINE
Original Filed March 13, 1953 12 Sheets-Sheet 4
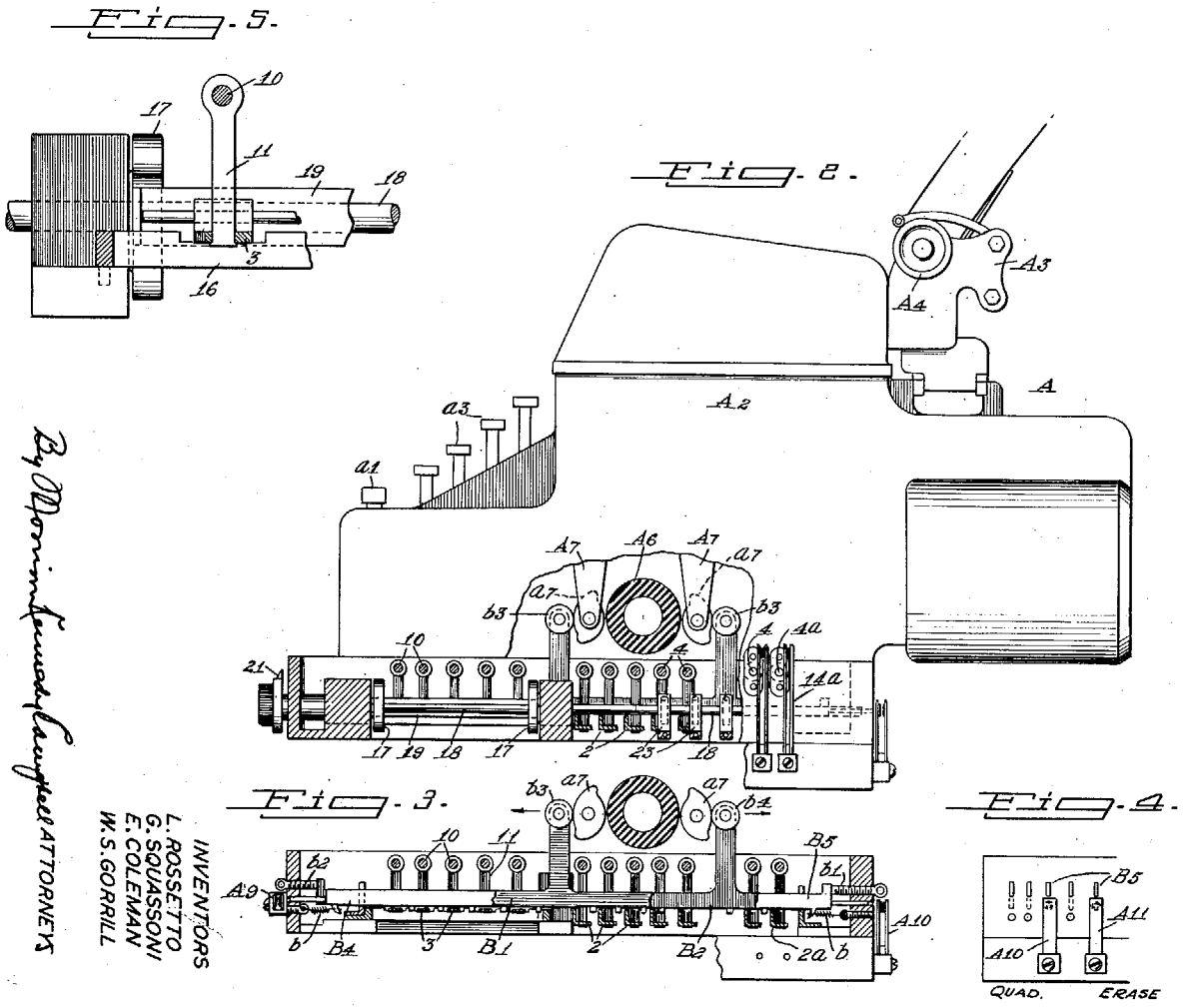
INVENTORS
L. ROSSETTO
G. SQUASSONI
E. COLEMAN
W. S. GORRILL
By Morrison Kennedy Campbell ATTORNEYS PHOTOCOMPOSING MACHINE
Original Filed March 13, 1953 12 Sheets-Sheet 5
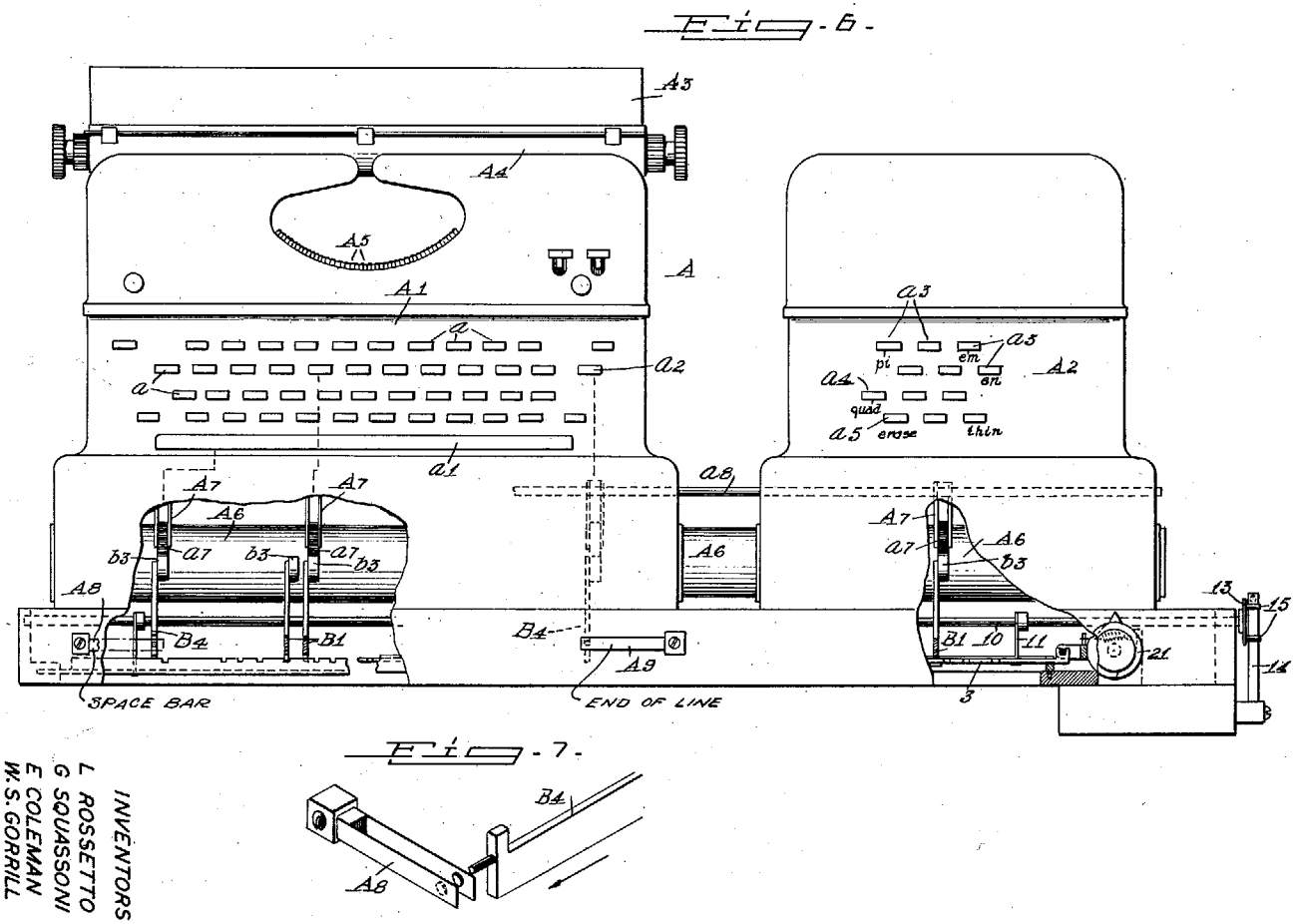
INVENTORS
L. ROSSETTO
G. SQUASSONI
E. COLEMAN
W. S. GORRILL
By Morison Kennedy & Campbell ATTORNEYS

PHOTOCOMPOSING MACHINE

Original Filed March 13, 1953 12 Sheets-Sheet 6

INVENTORS
L. ROSSETTO
G. SQUASSONI
E. COLEMAN
W. S. GORRILL

By Morrison, Kennedy & Campbell ATTORNEYS

PHOTOCOMPOSING MACHINE
Original Filed March 13, 1953 12 Sheets-Sheet 7
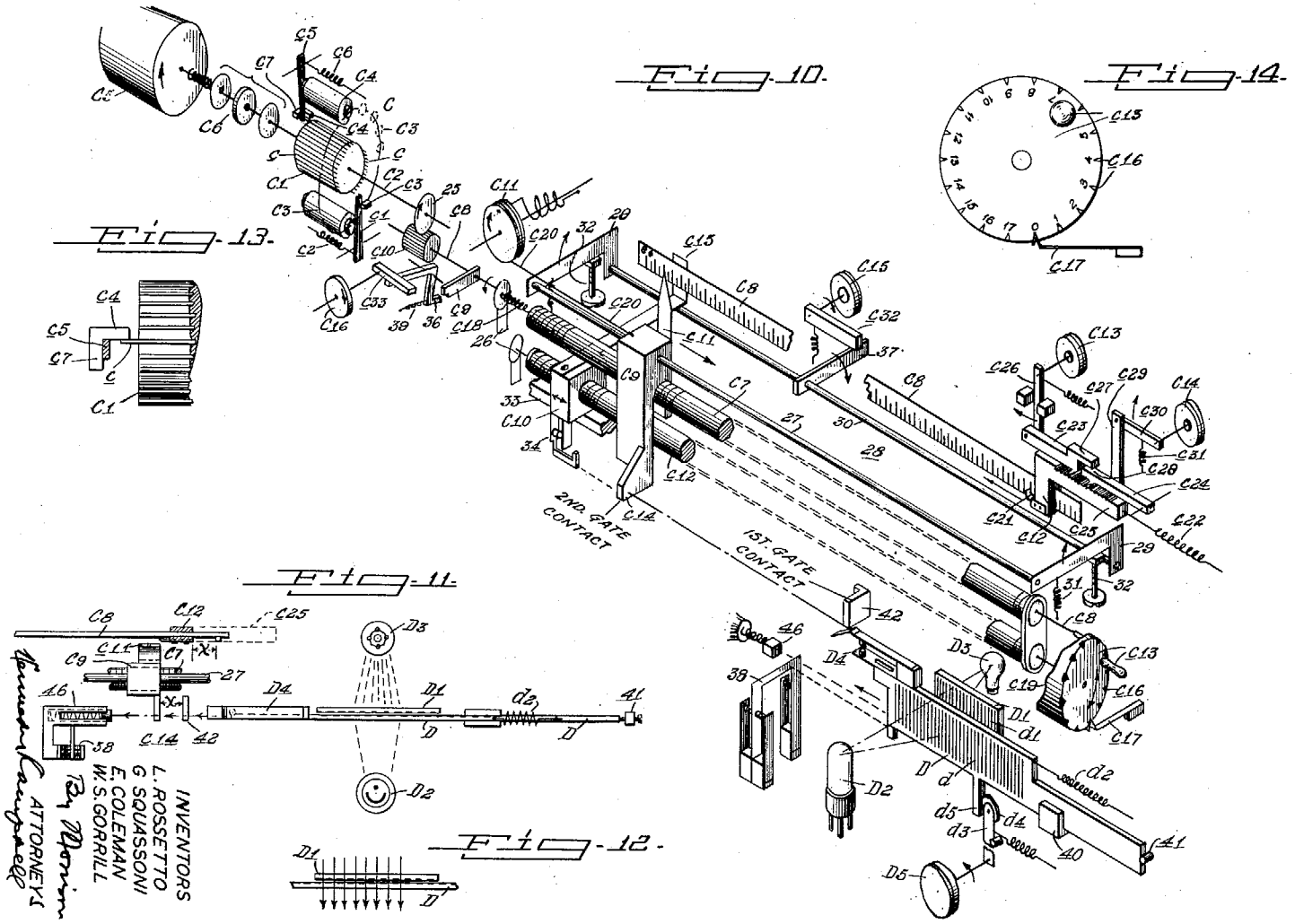
INVENTORS
L. ROSSETTO
G SQUASSONI
E. COLEMAN
W. S. GORRILL
By Morison
Kenneth Campbell
ATTORNEYS PHOTOCOMPOSING MACHINE
Original Filed March 13, 1953 12 Sheets-Sheet 8
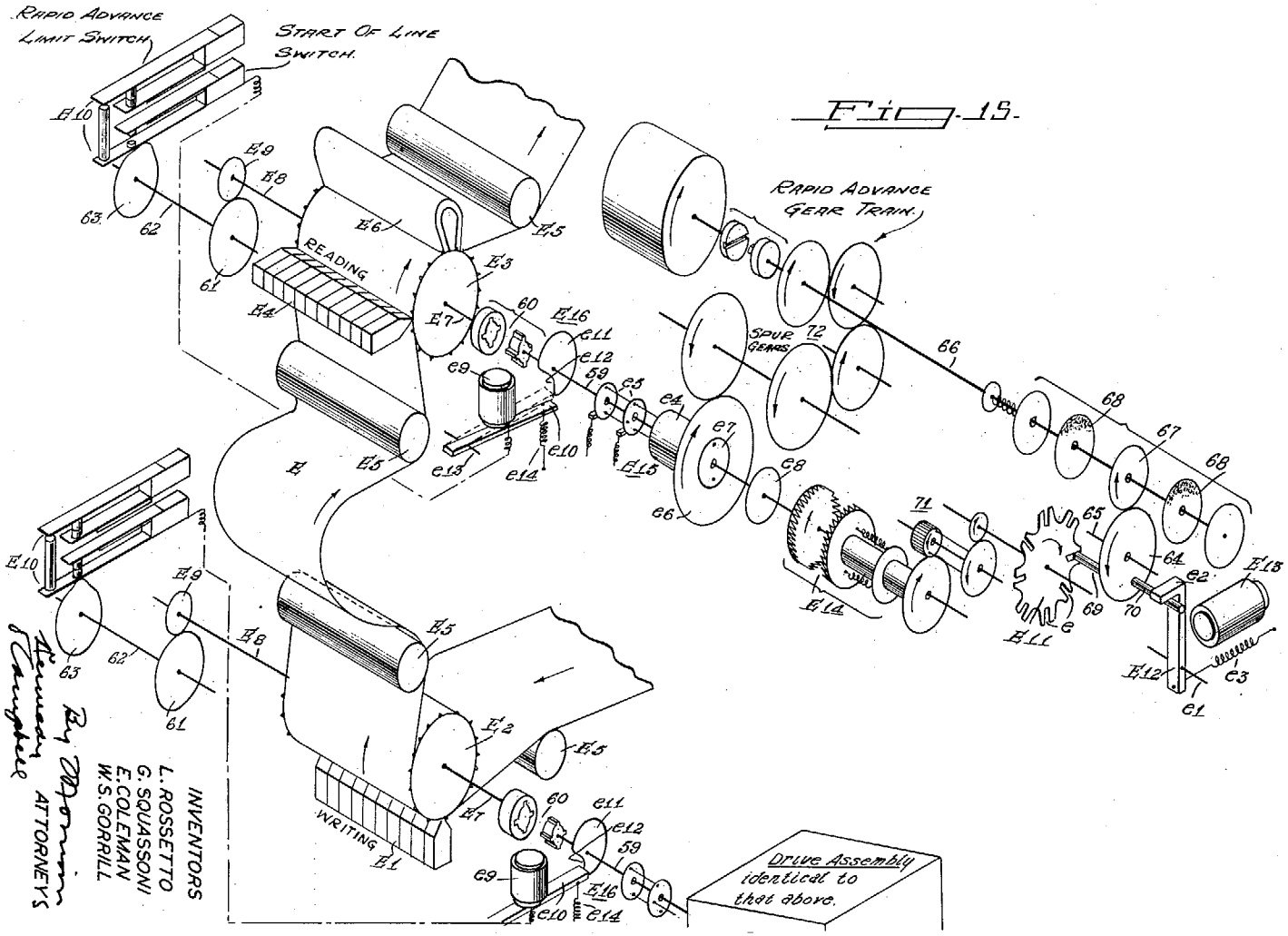

PHOTOCOMPOSING MACHINE

Original Filed March 13, 1953 12 Sheets-Sheet 9

INVENTORS
L. ROSSETTO
G. SQUASSONI
E. COLEMAN
W. S. GORRILL

By Morrison Kennedy & Campbell ATTORNEYS

PHOTOCOMPOSING MACHINE
Original Filed March 13, 1953 12 Sheets-Sheet 10
Fig. 17.
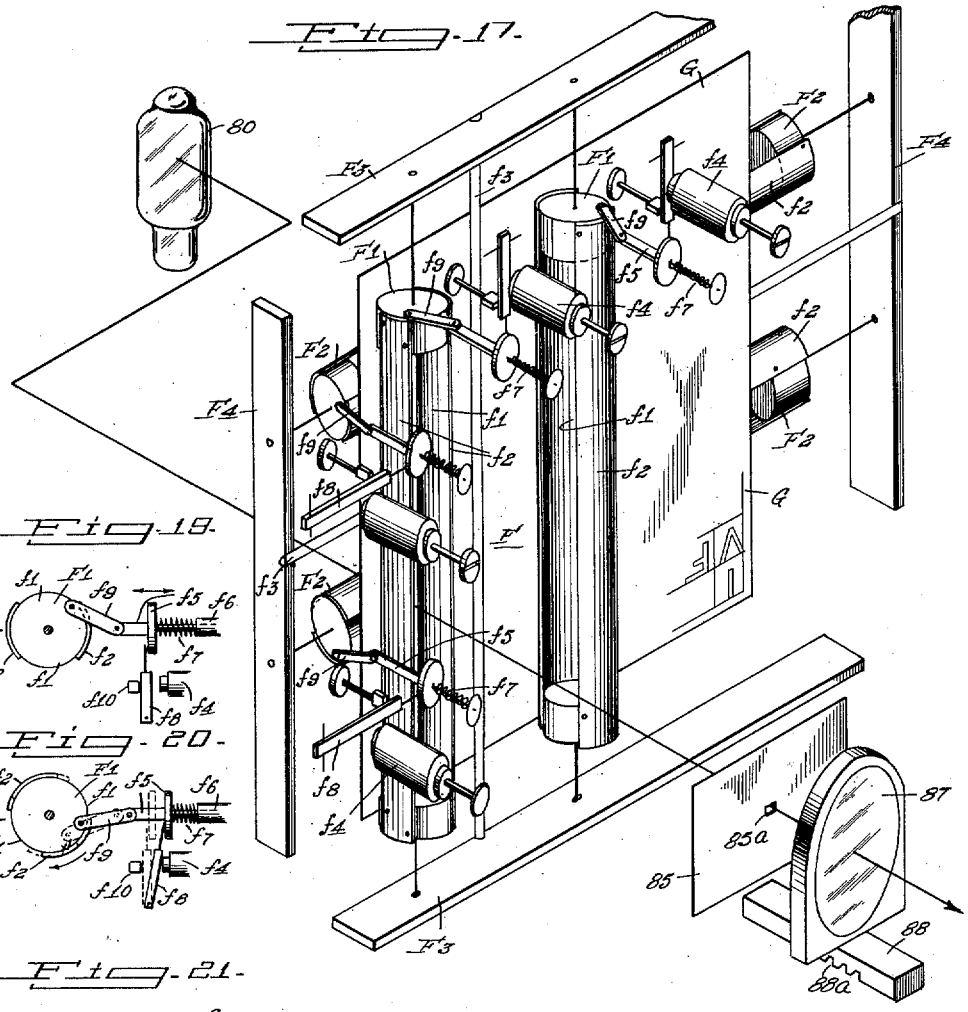
Fig. 19.
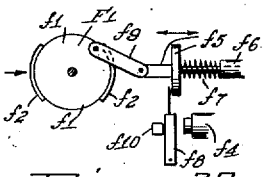
Fig. 20.
Fig. 21.
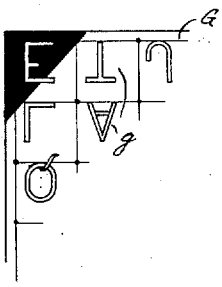
Fig. 18.
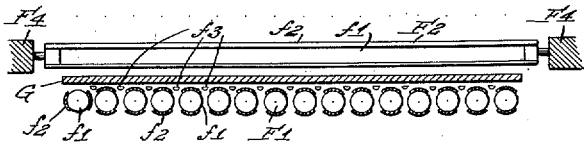
INVENTORS
L. ROSSETTO
G. SQUASSONI
E. COLEMAN
W. S. GORRILL
By Morrison, Kennedy & Campbell ATTORNEYS

PHOTOCOMPOSING MACHINE

Original Filed March 13, 1953 12 Sheets-Sheet 11

INVENTORS
L. ROSSETTO
G. SQUASSONI
E. COLEMAN
W.S. GORRILL

By Morrison Kennedy Campbell ATTORNEYS

PHOTOCOMPOSING MACHINE
Original Filed March 13, 1953 12 Sheets-Sheet 12
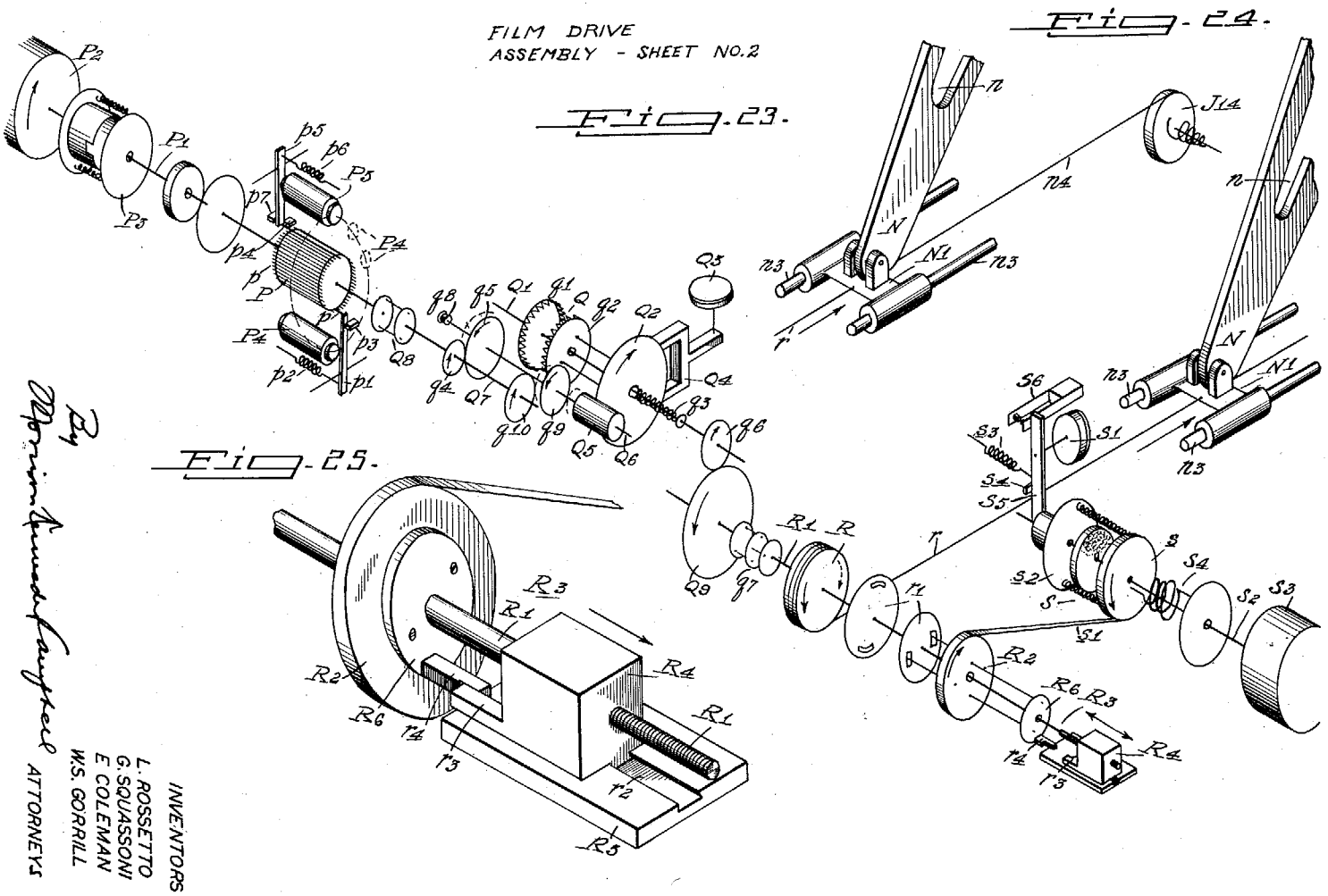
INVENTORS
L. ROSSETTO
G. SQUASSONI
E COLEMAN
W.S. GORRILL
By Morrison Kennedy Campbell ATTORNEYS United States Patent Office Re. 25,354
Reissued Mar. 19, 1963

25,354
PHOTOCOMPOSING MACHINE

Louis Rossetto, Kings Point, Gino F. Squassoni, Lynbrook, Eugene F. Coleman, Brooklyn, and William Sterling Gorrill, Glen Head, N.Y., assignors to Mergenthaler Linotype Company, a corporation of New York Original No. 2,847,919, dated Aug. 19, 1958, Ser. No. 342,156, Mar. 13, 1953. Application for reissue Sept. 12, 1960, Ser. No. 61,042
52 Claims. (Cl. 95—4.5)

Matter enclosed in heavy brackets [ ] appears in the original patent but forms no part of this reissue specification; matter printed in italics indicates the additions made by reissue.

This invention is directed to an improved photocomposing machine comprising, broadly, a keyboard section, a recording and releasing section, an output section and an optical system for photographing the individual typographical characters one after another in the order in which they are to appear in print.

The keyboard section of the improved machine includes an electric typewriter having a main keyboard, an auxiliary keyboard provided with additional character and functional keys, a coding unit common to both keyboards, and a series of electrical contacts controlled by said unit for transmitting key selected electrical impulses to the recording and releasing section. The coding unit comprises a front and a rear group of toothed spaced-apart code bars arranged directly beneath the typewriter in a suitable supporting frame and operable selectively by one or another of a series of overlying fore-and-aft slide bars, the latter being common to the code bars in both groups and controlled from the keyboard through the medium of a constantly driven rubber surfaced roller and two series of rotatable cam elements which are controlled from the various finger keys and arranged respectively along opposite sides of said roller.

The code bars of the front group are devoted to "character width" and are capable of endwise adjustment collectively to one or another of five different positions in order to select according to case (for roman, and italics, as well as for small caps, etc.), the proper code assignments for the various characters on both keyboards. Preferably, the code bars of the front group are mounted in a removable tray so that they may be conveniently removed for interchange, whenever a different font or type face is desired. On the other hand, the code bars of the rear group are permanently mounted in the keyboard frame and are devoted to "character identification," being adapted when activated to close momentarily the electrical contacts used to impart such information to the recording and releasing section of the machine. In the embodiment illustrated, the individual code bars of both groups are connected to slender rock shafts, from which they are suspended, in order that their functions may more readily be performed through the medium of these shafts. The rear group of code bars includes a so-called "universal bar" formed without code notches but operable each time a character or space is key-boarded, so as to close a separate electrical contact for purposes later to be pointed out. It also may be mentioned that the coding unit further includes three additional electrical contacts controlled by the adjusting means for the front group of code bars and used in completing character identification code for caps, italics, ligatures, etc.

As a line is being type or keyboarded and the code developed for the individual characters and spaces in the manner stated, the electrical impulses for that part of the coded information devoted to character width and word spacing is transmitted first to a "decoder" (relay bank)

and thence to a line indicator mechanism associated with the typewriter. These impulses are received by an electromagnetic escapement device which converts them into actuations of selected slides in a "squirrel-cage" assembly so as to set up cumulative shaft rotations proportional to the desired character widths. Such rotations, through the medium of a lead screw, appear as linear displacements in one direction of a line length pointer along a scale bar and in this way will indicate to operators the total unjustified length of a line during composition. At the same time a separate pointer advances intermittently in the opposite direction along the scale, each time the space bar is depressed, so that the two pointers, when they meet or pass one another, will indicate the initial and final limitations of the justification range of the machine.

When a satisfactory line has been keyboarded, the operator presses an end-of-line key adapted among other functions, and according to the present improvements, to instigate the operation of means for measuring the line remainder (the amount of line length that must be added thereto for proper justification), and converting this distance electronically as it is measured into a train of electrical impulses for computation purposes. Such means, in the preferred embodiment illustrated, includes an electrically operated transparent plate which is provided with opaque grid-like markings and is movable over a similarly marked transparent plate in the zone between a photoelectric cell and a lamp for sensitizing it. The electrical output of the cell, after amplification, is transmitted to a "pick-off" gate unit and thence to a justification computer wherein the number of impulses from the cell is divided by the number of word spaces in a composed line that have been accumulated in a stepping switch or "totalizer" of the computer. The arithmetical quotient is then stored on relays in code form, ready for use each time a word-space is to be set up during the photographing period.

The information transmitted from the coding unit to the line indicator mechanism, as well as the coded information devoted to "character identification," is transmitted at the same time over separate circuits to the recording and releasing section of the machine or so-called "memory" unit where it is temporarily stored and recorded in code form on an endless loop of magnetic tape. The recording means employed includes, in part, a bank or row of small electromagnets ("writing" elements) arranged transversely across the tape and adapted, when selectively energized, to produce saturated magnetic dot-like regions thereon. That is to say, and as already pointed out, when a character or space is keyboarded, electrical impulses are generated by the closing of certain electrical contacts of the coding unit (as determined by the code assignment for that particular character) and these pulses are adapted, in turn, to energize corresponding magnets in the recording bank for the purpose stated. As soon as a recording is made, the tape is advanced slightly (1/16"), due to the closing of the electrical "universal" contact, and held ready to receive the coded information on the next character.

After the keyboarding of a line has been completed, and as the "end-of-line" key is depressed, the tape is rapidly advanced a definite distance so that the keyboarding of the next line may begin and be recorded at the proper "start-line" station, the recording of each line on the tape always starting at one of two fixed positions thereon. Meanwhile, the tape again is rapidly advanced to carry the coded information for the line already recorded into a position for release by a second bank or row of small electromagnets ("reading" elements) during intermittent advance of the tape. The "reading" elements, like the writing elements, are arranged transversely across the tape but are adapted when energized by the passage of the magnetic dots thereon to generate voltage pulses which, after amplification, are used selectively according to the code assignments for the different characters and spaces in the optical system and also in the output section of the machine.

As the tape continues its intermittent advance, during the writing of the second line, the recording thereon for the first line, after being released by the bank of reading elements, is carried through the magnetic field of an "erasing head" or permanent magnet which obliterates all magnetic dots of such recordings and at the same time keeps the tape itself fully magnetized. If a recorded line happens to be the last one in the text, the actuation of the end-of-line key through the medium of relays is adapted, after the tape is rapidly advanced, to initiate the intermittent advance movement thereof which continues until all of the coded information thereon has been released in the manner just stated, and the tape again is stopped in the "start-of-line" position. Separate motor-driven mechanical drive trains, later to be described, are used to produce the desired intermittent writing and reading movements of the tape as well as the rapid advance movements thereof through any unused distances at the end of each recorded line. It may be mentioned that there are at least sixteen electromagnets in each of the two banks or rows associated with the magnetic tape of the recording and releasing section, nine being devoted to character identification, five to character width and two for the space bar and end-of-line key, respectively.

Amplified impulses from selected magnets of the reading group for character identification are directed to a decoder where they are set up in a "relay tree" which permits voltage pulses from a timing generator to be transmitted to the optical system of the machine where they in turn operate a shutter assembly so as to expose the individual characters of a composed line one after another in the order in which they should be photographed. The characters are transparent on an opaque background and arranged in rows and columns on a glass font plate or matrix. Monochromatic light from a mercury arc is directed to the character matrix by a condenser lens assembly and light from the desired character, after passing through a collimator lens and a pair of crossed diffraction gratings, is imaged by a second lens at a common aperture which is located on the optical axis of the optical system and formed in a screen for masking the rest of the images. The character image at the aperture then is reproduced on a photographic film by a final lens capable of adjustment toward and from the film to change the point size of the font in use, as desired.

The film is clamped in a spring propelled carriage arranged in front of the final lens and movable to advance the film intermittently across the optical axis of the system as the individual characters of a line are being successively photographed. Such movements of the film carriage are controlled from an electromagnetic escapement device through the medium of a "sine" bar and actuating means therefor later to be described. The escapement device is similar to the one mentioned for the line indicator mechanism, comprising magnets arranged about a rotatable "squirrel cage" drum and subject to being energized according to the angular position they occupy so as to permit corresponding shaft rotations proportional to the character widths and word spaces. In other words, these shaft rotations in turn, and through intermediate connections, determine the extent of the step by step movements of the film carriage while a line is being photographed.

Impulses from the reading electromagnets devoted to character width are directed, after being amplified, to a second decoder where they too "set up" a relay tree that permits voltage pulses from the timing generator to energize selectively one or another magnet in the escapement device and allow the film carriage to move the proper distance. The character width circuits also include a gate relay electrically connected to the justification storage unit before referred to, so that after the pulses from the reading magnet for the space bar have been amplified, the gate relay will be closed in order to permit information from said storage unit to pass and set up the relay tree of the character width decoder. As a result, voltage pulses from the timing generator are allowed to energize the proper magnet of the escapement device for the film carriage, and thus permit the latter to advance the necessary distance for a word space of a justified line.

After the last character of a line has been photographed the film carriage is automatically restored to its normal position by electro-mechanical means as the end-of-line relay and amplifier are energized. As the carriage arrives in its start-of-line position, it is adapted in turn to operate an electric double-contact switch which causes a charged condenser to instigate the operation of electrically controlled means whereby the film first is unclamped from the carriage, then advanced a step for line spacing, and finally reclamped to the carriage in proper position for the next exposure.

The keyboard unit also includes two other auxiliary keys, i.e., a quad key and an erase key, the former operable when it is desired to quad out short lines to the proper justifying length as shown on the line indicator, and the latter (erase key) operable to remedy any mistakes that may be made in composition during the keyboarding of a line. When the quad key is actuated and held depressed it is adapted, through the medium of a relay, to energize a non-justifying minimum space relay for setting up an appropriate signal which is transmitted to the character width decoder during a period when the gate relay associated therewith is closed. In addition, the quad relay energizes the end-of-line relay so that the latter may proceed to perform its normal functions as already indicated. Operation of the erase key, which is permitted during the composition of the "second" line after the first line is "read out," is adapted through the medium of relays, including the one for end-of-line, to cause two uninterrupted rapid advance cycles of both driving trains for the tape, and in this way not only carry the second or defective line past the erase magnet but also locate the tape again in its start-of-line position.

The construction of the parts in the various organs of the machine and the manner in which they function will best be understood from the detailed description to follow. However, it may be well to state at this point that the present machine, while capable of operating on any desired unit system, is herein shown and described as operating on an 18-unit basis, that is to say, 18 units to the em, the characters varying in set width on that basis.

In the accompanying drawings, the improved machine has been shown more or less schematically in preferred form only and obviously many changes and variations may be made therein without departure from the invention involved. It should therefore be understood that the invention is not limited to any specific form or embodiment except insofar as such limitations are specified in the appended claims.

Referring to the drawings:

FIGS. 1 and 1–A together show a complete electrical block diagram of the improved photocomposing machine;

FIGS. 1–B, 1–C and 1–D show schematically the steps employed in justifying a composed line by adding the spaces obtained electronically to the minimum spaces in the line;

FIG. 2 is a side elevation of the electric typewriter partly in section and broken away to show portions of the coding mechanism;

FIG. 3 is a vertical section through the coding mechanism;

FIG. 4 is a detail rear elevation of a portion of the supporting frame for the code bars, showing the location of the quad and erase switches;

FIG. 5 is a detail showing a portion of the character width tray and the manner of supporting the code bars therein;

FIG. 6 is a front elevation of the main and auxiliary members of the electric typewriter showing the main and auxiliary keyboards and partly broken away to show parts of the coding mechanism;

FIG. 7 is a detail perspective of the space bar switch and its actuating fore-and-aft slide bar;

FIG. 10 is a schematic perspective view of the line indicator and line remainder "pick-off" mechanisms, showing also the power drive for the lead screw and the intermediate electro-magnetic escapement for controlling the partial rotations of said screw;

FIG. 11 is a top plan view showing the electronic means employed for measuring the line remainder;

FIG. 12 is a detail indicating the passage of light rays through the two grid plates as one is moved relatively to the other during the measuring operation;

FIG. 13 is a fragmentary detail showing a portion of the escapement drum and the associated stop for arresting actuated slides in said drum;

FIG. 14 is a detail face view of the knob for setting the banking nut for the line length pointer slide;

FIG. 15 is a perspective view showing schematically the memory assembly;

FIG. 17 is a perspective view showing schematically part of the shutter assembly of the optical system;

FIG. 18 is a horizontal section through the drums and character matrix of the shutter assembly;

FIG. 19 is a detail end view showing one of the shutter drums in its closed position, and the spring controlled magnetically operated linkage for rotating it through ninety degrees in opposite directions;

FIG. 20 is a detail similar to FIG. 19, showing the shutter drum moved to its open position;

FIG. 21 is a detail showing a portion of the character matrix or font plate;

FIG. 23 is a perspective view showing schematically the mechanism, including an electro-magnetic escapement device, for controlling the advance of the film carriage through the medium of the sine bar, and showing also the mechanism employed for restoring said bar and carriage to their normal position;

FIG. 24 is a detail perspective view showing schematically the means for supporting the sine bar and the spring drum employed to facilitate the operation of said bar; and FIG. 25 is a perspective view of the precision stop employed.

KEYBOARD AND CODING MECHANISM

Figure 1:
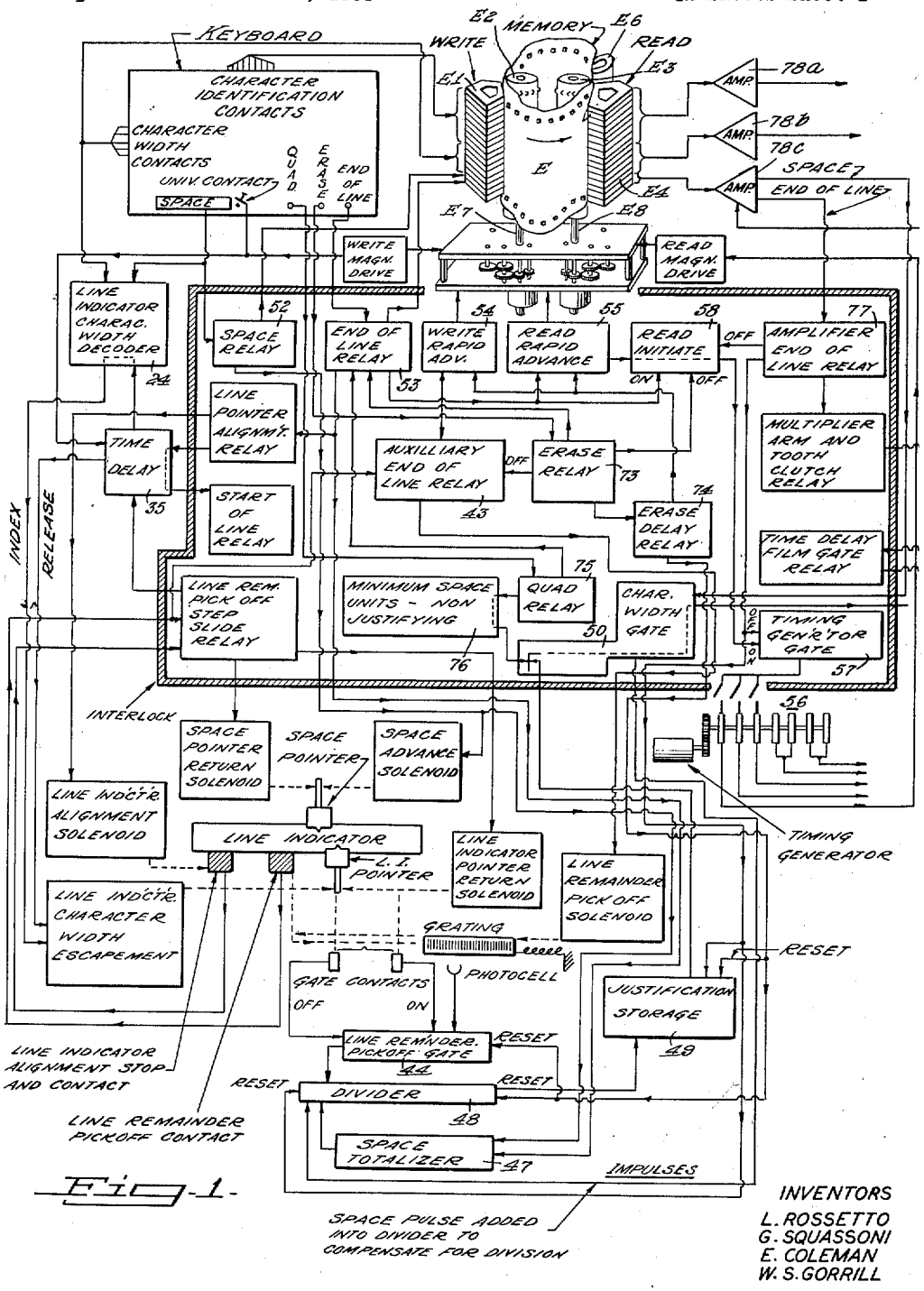
Figure 1A:
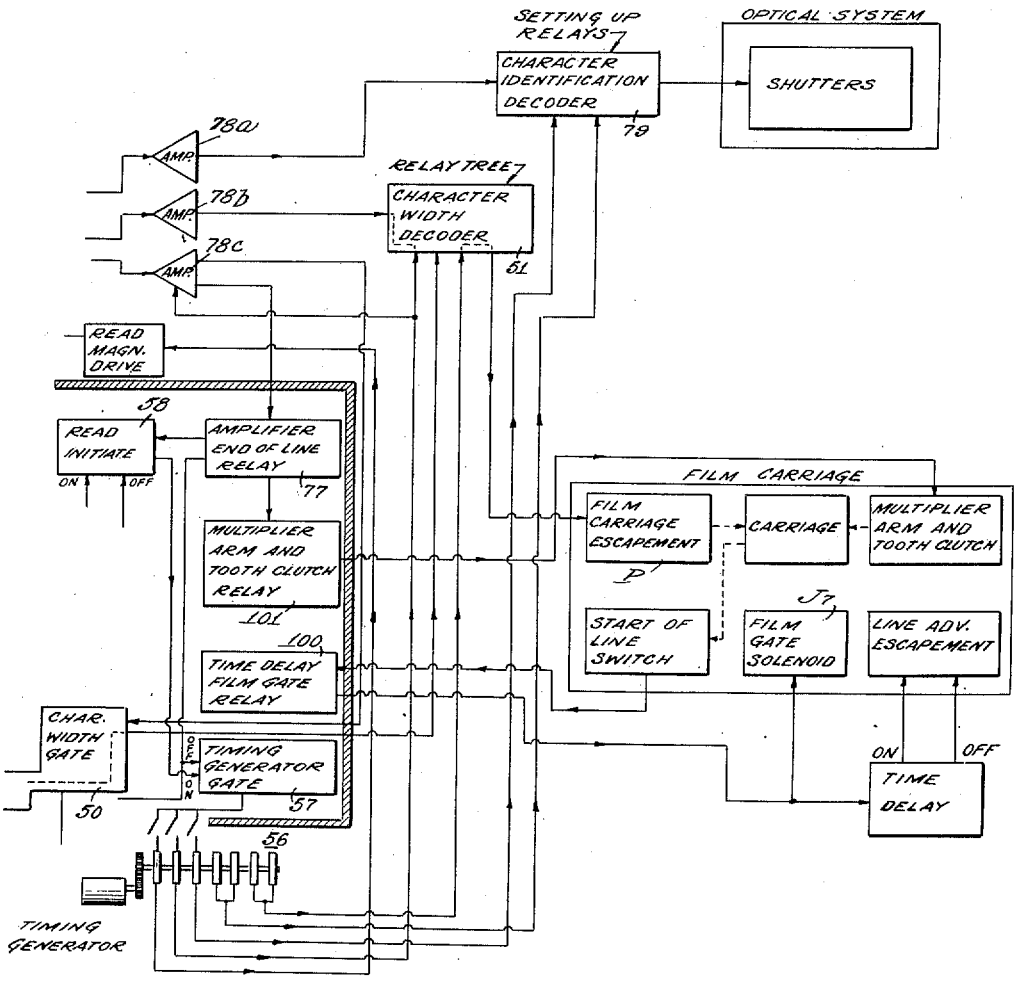

As best shown in FIGS. 1 to 9 inclusive, this particular section of the improved machine includes an electric typewriter A equipped with a main keyboard $A^1$ (42 character keys a, space bar $a^1$, a functional end-of-line key $a^2$, and several other finger keys common to typewriters in this particular class); an auxiliary keyboard $A^2$ (12 keys including character keys $a^3$, a functional quad key $a^4$ and an erase key $a^5$) arranged alongside the keyboard $A^1$; and a coding unit B located directly beneath the keyboards $A^1$ and $A^2$ in operative relation thereto. The typewriter A (FIGS. 2 and 6) also is equipped, as usual, with a paper carriage $A^3$, platen $A^4$, type elements $A^5$, etc., so that the operator may see at all times a copy of the script at it is being composed and thus detect any errors therein that should be erased.

In order to obtain sufficient force and motion to operate the keyboard coding mechanism when the space bar or a finger key of either the main or auxiliary keyboard is depressed, the rocking levers $a^6$, to which they are attached, are operatively connected individually through appropriate linkage to rotatable cam elements $a^7$ located in engaging relation to the outer surface of an elongated constantly driven rubber covered roller $A^6$ common to both keyboards. In the embodiment illustrated (FIGS. 6, 8 and 9), the cam elements $a^7$ are mounted at the lower ends and between the side walls of bifurcated spaced-apart supporting members $A^7$ arranged in two rows (28 in each) disposed along the front and rear sides of the roller $A^6$, those in each row being suspended from a separate pivot rod $a^8$ extending completely across the typewriter so as to sustain through said members the twelve cam elements required for the auxiliary keyboard $A^2$ as well as the forty-four cam elements required for the main keyboard $A^1$.

The cam elements $a^7$ on one side of the drive roller $A^6$ are staggered in relation to those on the other side and are adapted when rotated by said roller, in a manner about to be described, to actuate or push endwise in opposite directions, adjacent fore-and-aft spring controlled slide bars $B^1$ and $B^2$ of a series associated directly with the keyboard coding unit B. As shown best in FIG. 8, the slide bars $B^1$ and $B^2$ are mounted individually in suitable supports $B^3$ and each is provided with a pull spring b for holding them yieldingly in their normal position against adjustable stop screws $b^1$ and $b^2$, the former being arranged to engage the rear ends of the bars $B^1$ and the latter arranged to engage the front ends of the bars $B^2$. Operation of the fore-and-aft slide bars $B^1$ is effected, against the tension of their springs b, by rotation of the front row of key controlled cam elements $a^7$ through their engagement with anti-friction rollers $b^3$ carried by said bars; and operation of the slide bars $B^2$ is effected in like manner by rotation of the rear row of key controlled cam elements $a^7$ which are directly opposed to anti-friction rollers $b^4$ carried by the bars $B^2$.

As already stated, the supporting members $A^7$ are each formed with spaced-apart side walls, and the cam elements $a^7$ as well as the linkage connecting them to the finger keys of both keyboards $A^1$ and $A^2$, are arranged between said walls. Such linkage (FIG. 9) includes a relatively small bell-crank lever $a^9$ mounted on a pivot pin $a^{10}$ and operatively connected through the medium of a vertical link $a^{11}$ and a horizontal lever $a^{12}$ to the rocking lever $a^6$ of the associated finger key. The shorter arm of the lever $a^9$, as indiated by the dotted lines in FIG. 9, engages the contiguous forked end of the lever $a^{12}$; and the longer arm thereof, which depends from the pivot pin $a^{10}$, is offset at its lower end to provide a stop shoulder $a^{13}$ normally disposed in the path of one or the other of a pair of diametrically opposed studs $a^{14}$ projecting laterally from one side face of the cam element $a^7$. To maintain the cam element in its inactive position (as determined by the engagement of either of the studs $a^{14}$ with the stop shoulder $a^{13}$), the linkage further includes a spring actuated finger $a^{15}$ which also depends from the pivot pin $a^{10}$ and terminates in engaging relation to another pair of diametrically opposed studs $a^{16}$ projecting from the same side face of the cam element $a^7$. A fixed horizontal stop rod $a^{17}$, common to all of the members $A^7$ in each row, serves to locate them in their normal position (FIG. 9) against the tension of individual pull springs $a^{18}$, with the cam elements $a^7$ just clearing the outer surface of the constantly driven roller $A^6$. However, when a finger key is actuated, the rocking lever $a^6$ thereof is adapted, through its connection with the bell-crank lever $a^9$, to rock the latter momentarily out of engagement with the active stud $a^{14}$ of the cam element and permit said cam element to be pressed into frictional engagement with the drive roller $A^3$ by the spring actuated finger $a^{15}$. As a result, the cam element $a^7$ is turned counter-clockwise (FIG. 9) by the roller $A^6$ to impart, through its engagement with the antifriction roller $b^4$, the required endwise movement to the associated fore-and-aft slide bar $B^2$ of the coding unit B. Of course, in the case of a slide $B^1$, it will be moved forwardly by the engagement of its roller $b^3$ with the roller $A^6$.

Figures 8, 9:
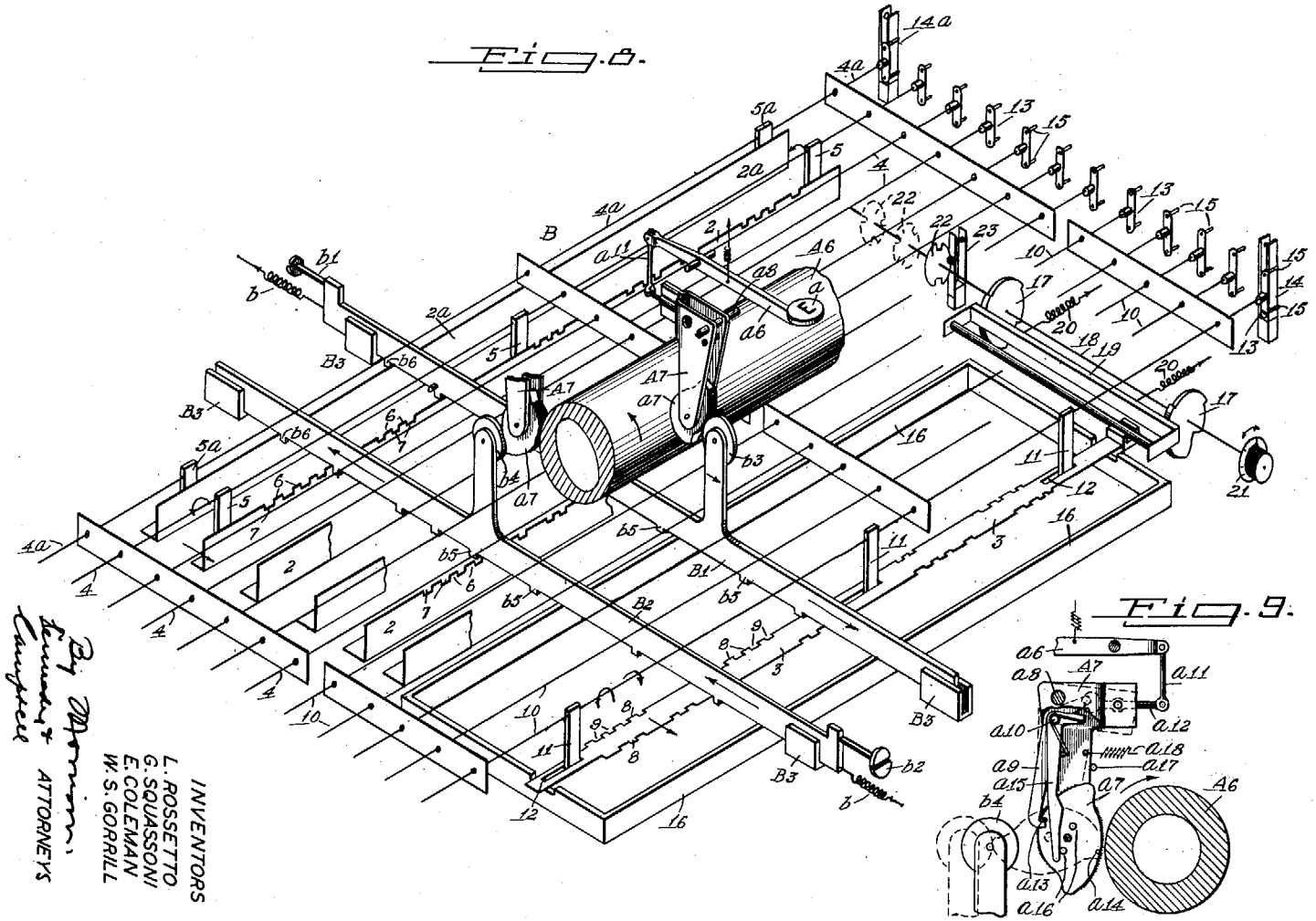
FIG. 8 is a perspective view showing schematically the keyboard coding mechanism.
FIG. 9 is a detail vertical section showing the key controlled linkage for tripping the individual cam elements which actuate the fore-and-aft bars of the coding unit.

The coding assembly (FIG. 8) further includes two sets or groups of elongated spaced-apart code bars 2 and 3 respectively, and a so-called universal bar $2^a$, all arranged directly beneath the fore-and-aft slide bars $B^1$ and $B^2$ and extending longitudinally of the typewriter substantially throughout its whole length. The rear code bars 2 (six in number) are devoted to character identification and, as shown schematically in FIG. 8, are suspended individually from separate horizontal rock shafts 4 by integral supporting members 5 pinned to said shafts. In their upper edges, the code bars 2 (which are L-shaped in cross section) present rows of tooth-like projections 6 and intermediate clearance notches 7; while the front code bars 3 (5 in number), which are flat in cross section and devolted to character width, present in their opposite edges short rows of similar tooth-like projections 8 and intermediate clearance notches 9. The code bars 3 also are suspended from separate rock shafts 10 by vertical supporting members 11, but unlike those of the code bars 2, these members 11 engage slots 12 formed longitudinally in the code bars 3 so that the latter may be shifted endwise collectively from and to any one of five different positions in relation to the overlying fore-and-aft slide bars $B^1$, $B^2$ and in this way select, as desired, the proper character width codes for caps and lower case in either roman or italics, as well as the width codes for small caps, etc. The slide bars $B^1$ and $B^2$ (FIG. 8) also are formed respectively on their lower edges with tooth-like projections $b^5$ which are spaced apart so as to be located normally in operative relation to the projections 6 and 8 of selected code bars 2 and 3. In other words, the arrangement is such that when a character key of either keyboard is depressed, the corresponding slide bar $B^1$ or $B^2$ will be actuated in the manner before described and, through the appropriate code bars 2 and 3, rotate the associated rock shafts 4 and 10 in one direction or the other to develop electrically the proper code assignment or signal for the character desired. To bring about this result, each one of the rock shafts 4 and 10 at the extreme right (FIG. 8) is in turn provided with a vertically disposed lever 13 keyed or otherwise secured thereto between its ends and arranged adjacent a normally open contact switch 14. Closing of the switches 14 is effected by one or the other of a pair of studs 15 projecting laterally from the opposite ends of the individual levers 13 and adapted to function irrespective of the direction in which the rock shafts 4 and 10 may be rotated. The code assignment or signal thus developed for any particular character selected then is transmitted in electrical form from the switches 14 to the "memory" section of the improved machine, before referred to and later to be described.

According to the present improvements, the code bars 3 are arranged in a tray 16 that may readily be removed from the machine for replacement in order to change when desired the character width code for text matter of a different size or face. It also may be noted (FIG. 8) that the "universal" bar $2^a$ before mentioned, although alike in form and associated with the group of code bars 2, is devoid of code notches so that it will be actuated by all character keys of both keyboards through the individual fore-and-aft bars $B^1$ and $B^2$, the latter being formed with an additional tooth-like projection $b^6$ arranged to engage the bar $2^a$ adjacent its upper edge. A separate rock shaft $4^a$ and members $5^a$ depending therefrom support the bar $2^a$ in its normal position, and a separate contact switch $14^a$ controlled by the rocking movement of said shaft is employed for use in connection with the "memory" unit.

The collective endwise shifting of the five character width code bars 3 to and from their normal or "lower case" coding position, for the reasons already stated, is effected by the rotation of a pair of spaced-apart edge cams 17 mounted on a fore-and-aft shaft 18 (FIG. 8) and engaging a similarly disposed shift bar 19, which latter is held yieldingly against the cams by pull springs 20 and is operatively connected to the free right hand ends of said code bars. At its front end, the shaft 18 is provided with an appropriate setting dial 21 whereby it may be turned and, through the medium of the cams 17, shift the code bars 3 against the tension of the springs 20 from their normal position to their several other active positions, as indicated by the numerals 1 to 5 on the dial. At its rear end, the shaft 18 is extended sufficiently beyond a bearing bracket (not shown) to accommodate three additional cam elements 22 which are disposed in different angular positions thereon and adapted under different settings of the dial 21 to selectively close three electrical contacts 23 associated therewith. That is to say, when caps, ligatures, etc., appearing in the copy are to be composed, the dial 21 is set accordingly in the proper position so that one or two of the contacts 23 may function to complete the character identification code assigned to these characters. The dial 21, of course, is conveniently located on the typewriter A, readily manipulated and the markings thereon easily read by the operator in order to facilitate its setting and resetting, for the purpose just stated.

While the actuation of the space bar $a^1$ or any one of the functional finger keys $a^2$, $a^4$ and $a^5$, is adapted through the release of a cam element $a^7$ to cause the operation of a fore-and-aft slide bar of the coding unit, these particular bars $B^4$ and $B^5$ (FIGS. 2, 3, 4, 6 and 7) are devoid of the tooth-like projections $b^5$ and each is arranged to operate directly an electrical contact switch associated therewith. For example, when the space bar $a^1$ is actuated, one of the two slide bars $B^4$, to which it is connected (FIGS. 3 and 6), will be moved forwardly away from its stop screw $b^1$ against the tension of its spring b so as to close an electrical switch $A^8$ attached to the front face of the supporting frame for the typewriter A; and when the end-of-line key $a^2$ is actuated, the other slide bar $B^4$ will be moved forwardly in like manner to close a second contact switch $A^9$ also attached to the front face of said supporting frame.

Unlike the slide bars $B^4$, the two fore-and-aft slide bars $B^5$ are capable of endwise movement rearwardly in opposition to their springs b and away from their stop screws $b^2$ in order to close one or the other of two electrical switches $A^{10}$ and $A^{11}$ which are secured to the rear face of the typewriter supporting frame. Consequently, when the quad key $a^4$ is depressed, it is adapted to cause the rearward movement of the slide bar $B^5$ associated therewith as well as the resultant closing of the switch $A^{10}$; and when the erase key $a^5$ is actuated it is adapted to function in a similar fashion through the other slide bar $B^5$ to close the electrical switch $A^{11}$. In this way, the space bar $a^1$ and the finger keys $a^2$, $a^4$ and $a^5$ are enabled when actuated to energize separate relays which in turn permit them through other electrical equipment to perform their individual functions in a manner later to be pointed out.

LINE INDICATOR AND LINE REMAINDER PICK-OFF MECHANISM

As a line is being composed on the typewriter, information from the five code bars 3 devoted to character width, as well as that from the space bar $a^1$, is transmitted electrically through relays of a decoder 24 (FIG.

1) to an electro-magnetic escapement device C (FIG. 10) which forms part of a line indicator mechanism associated with the typewriter. The space bar $a^1$ of the keyboard $A^1$ as well as the end-of-line key $a^2$ also are electrically connected through separate relays to other parts of the mechanism about to be described.

As best shown schematically in FIG. 10, the escapement device C comprises a drum $C^1$ keyed or otherwise secured to a horizontal drive shaft $C^2$ and slotted longitudinally so as to accommodate a series of twenty-five equally spaced-apart slides c movable endwise individually to and from active position. Actuation of the slides c is effected by the selective energization of one or another of a series of twenty-four stationary electro-magnets $C^3$ disposed concentrically about the axis of the drum with their pivoted arms $c^1$ arranged in engaging relation to the protruding ends of a corresponding number of the slides c. While only eighteen such electromagnets would be needed for most characters, which have a set width of less than one em, there are some characters which have a greater width and which run as high as 24 units, such as the ligatures "ffl" and "ffi." The arms $c^1$ of these indexing magnets $C^3$ are controlled by pull springs $c^2$ which hold them yieldingly against stop pins $c^3$ properly spaced from the magnet cores. When one of the magnets $C^3$ is charged and the associated slide c is actuated by the magnet arm $c^1$, the opposite end of the slide will be projected sufficiently far beyond the end of the drum $C^1$ to engage a fixed stop element $c^4$ and thus positively arrest the drum during its rotation by the drive shaft $C^2$. At such time the projecting end of the active slide c will be located directly in front of the arm $c^5$ of a single release magnet $C^4$ adapted to function substantially in synchronism with the charging of the magnet $C^3$ next selected, so as to push the arresting side c out of engagement with the stop element $c^4$ and back to its original or normal position. The arm $c^5$ of the release magnet $C^4$, like the arms of the magnets $C^3$, is controlled by a pull spring $c^6$ and held yieldingly thereby against a stop pin $c^7$ in proper spaced relation to the core of said magnet. In this way, the information sent out by the keyboard coding unit B for the different character widths, and that sent out by the space bar $a^1$ (representing 3 units as the minimum word space), is converted into partial shaft rotations which are used to operate the line indicator mechanism.

The drive shaft $C^2$ (FIG. 10) receives its motion from an electric motor $C^5$ through the medium of a slip clutch $C^6$, and at its free end said shaft is provided with a spur gear 25 for imparting its partial rotations to a lead screw $C^7$, the shaft $c^9$ of the latter being extended beyond one of its bearing posts 26 and having secured thereto an arm $c^9$ and also a gear $c^{10}$, which latter meshes constantly with the spur gear 25 and is thicker than usual for reasons presently to appear. The indicator mechanism also includes a scale bar $C^8$ having graduated em and en markings reading preferably from right to left; and also a line-length pointer $c^{11}$ movable along the scale bar by the partial rotations of the lead screw $C^7$ so as to indicate the length of a line as it is being composed. The pointer $c^{11}$ is attached to a supporting block $C^9$ arranged astride the lead screw $C^7$ so that it may be raised and lowered to break and make threaded engagement therewith. For this purpose, the block $C^9$ (FIG. 10) is slidably connected to the cross rod 27 of a bail member 28, the side arms 29 of which are secured to a horizontal rock shaft 30 mounted in suitable bearings of the supporting frame. Raising of the pointed block $C^9$ takes place in opposition to a pair of pull springs 31 connected to the side arms of the bail member 28 and acting to hold the latter in its normal position upon vertically adjustable screw elements 32 with the threads of the pointer block $C^9$ in proper orientation with those of the lead screw $C^7$.

To locate the line-length pointer $c^{11}$ in any pre-selected start-of-line position, the assembly further includes a banking nut $C^{10}$ for the pointer supporting block $C^9$, said nut (FIG. 10) being mounted on a horizontally disposed screw rod $c^{12}$ which also is journalled in the bearing posts 26 and is provided at one end with a knob or handle $c^{13}$ whereby it may be rotated in one direction or the other to set the banking nut in different positions. The banking nut $C^{10}$ is constrained to ride upon a horizontal guide rail 33, as it is being set for lines of a different justified length, and carries an electrical contact switch 34 controlled by an offset projection $c^{14}$ of the pointer block $C^9$ as the latter is moved to and from its starting position against the nut $C^{10}$.

Such settings of the banking nut $C^{10}$ are also indicated on the scale bar $C^8$ by a second pointer $c^{15}$ which is attached to the nut and projects slightly above the rear side face of the scale bar. To obtain the accuracy required in setting the banking nut $C^{10}$ in its different positions (i.e. within the unit fractions of one em), the turning knob $c^{13}$ for the screw rod $c^{12}$ is formed in its outer side face with 18 marked peripheral notches $c^{16}$ (FIGS. 10 and 14), and a spring-pressed pawl or detent $c^{17}$ is employed to yieldingly hold the knob and screw rod, through its engagement with one or another of said notches, in different angular positions. However, before setting the banking nut $C^{10}$, the supporting block $C^9$ for the line-length pointer must be lifted manually out of engagement with the lead screw $C^7$, which then is at rest and capable of a slight endwise adjustment, against the tension of a compression spring $c^{18}$, by a shallow-stepped cam surface $c^{19}$ formed on the inner surface of the knob $c^{13}$ and engaging an antifriction roller (not shown) on the contiguous end of the screw shaft $c^8$. A spring drum $C^{11}$, connected to the pointed block $C^9$ by a flexible band or cable $c^{20}$, tends constantly to urge the block toward its start-line position as a line is being composed and normally holds it yieldingly against the banking nut $C^{10}$. After the banking nut $C^{10}$ has been properly reset, the pointed block $C^9$ is allowed to move under manual control back along the cross rod 27 of its supporting bail member 28 until it is arrested by the nut $C^{10}$ and then is lowered into proper engagement with the lead screw $C^7$, the preceding endwise adjustment of said screw by the stepped cam surface $c^{19}$ of the knob $c^{13}$ serving to insure and facilitate such engagement.

The line indicator mechanism also includes a space pointer $c^{21}$ located near the right hand end of the scale bar $C^8$ and movable each time the space bar $a^1$ is actuated, in increments of 21/18 ems, toward the line-length pointer $c^{11}$. As shown best in FIG. 10, the space pointer $c^{21}$ is secured to an angular slide member $c^{12}$ mounted on the scale bar $C^8$, and its intermittent movements are effected against the tension of a pull spring $c^{22}$ by a rotary solenoid $C^{13}$ through the medium of two pawls $c^{23}$ and $c^{24}$, respectively, which engage a ratchet bar $c^{25}$ of said slide member. The advancing pawl $c^{23}$ is pivotally connected to the free end of the spring controlled arm $c^{26}$ of the solenoid $C^{13}$ and is formed with a nose portion $c^{27}$ overlying a similar projection $c^{28}$ on the retaining pawl $c^{24}$, so that both pawls may be disengaged from the ratchet bar $c^{25}$ simultaneously preparatory to a resetting of the slide member by its control spring $c^{22}$. Therefore, the retaining pawl $c^{24}$ is mounted to swing about a fixed pivot and connected by a vertical link $c^{29}$ to the arm $c^{30}$ of another rotary solenoid $C^{14}$. A light pull spring $c^{31}$, attached to the solenoid arm $c^{30}$, holds the retaining pawl $c^{24}$ yieldingly engaged with the ratchet bar $c^{25}$. As thus arranged, every time the space bar $a^1$ is depressed during composition, the solenoid $C^{13}$ will be energized momentarily and move the space pointer $c^{21}$ step by step along scale bar $C^8$ in the direction of the approaching line-length pointer $c^{11}$, while the retaining pawl $c^{24}$ acts to sustain the space pointer against the tension of the spring $c^{22}$ in its different advanced positions.

After a line is completely composed to the proper justifying length and the line pointer $c^{11}$ has registered with or passed the space pointer $c^{21}$, the remaining distance between the line-length pointer and a zero mark on the scale bar $C^8$ is measured electronically by means yet to be described, and the solenoid $C^{14}$ then is energized to lift the pawls $c^{23}$ and $c^{24}$ out of engagement with the ratchet bar $c^{25}$ so that the space pointer $c^{21}$ may be returned to its starting position by the pull spring $c^{22}$. At or about the same time, several other operations incidental to the line indicator mechanism are effected electrically or electro-mechanically in a predetermined order of succession. That is to say, a single pulse from an electrical source 35 (labeled Time Delay on the block diagram in FIG. 1) is transmitted to the release magnet $C^4$ of the escapement device C before described, in order to permit the drum $C^1$, as well as the drive shaft $C^2$, to turn idly through a sufficient number of degrees to swing the arm $c^9$ of the lead screw shaft extension $c^8$ into engagement with an angular stop element 36 (FIG. 10) and thus positively arrest the rotation of the lead screw $C^7$ in its proper start-line position.

Meanwhile, however, the supporting block $C^9$ for the line-length pointer $c^{11}$ first is raised automatically, in opposition to the pull springs of the bail member 28, out of its engagement with the threads of the lead screw $C^7$, and thereupon is pulled back along the cross rod 27 of the bail member until stopped by the banking nut $C^{10}$ preparatory to being lowered into engagement again with the threads of the lead screw. Raising and lowering of the pointer block $C^9$ is accomplished at such times by first energizing and then de-energizing a third rotary solenoid $C^{15}$ (FIG. 10) having an arm $c^{32}$ arranged in engaging relation to a crank arm 37 which projects rearwardly from the rock shaft 30 of the bail member 28. Energizing of the solenoid $C^{15}$ to raise the pointer block $C^9$ is effected by the closing of one contact of a two-way switch 38; and the de-energizing of said solenoid to permit the springs 31 of the bail member to act in lowering the pointer block is effected as the latter banks against the nut $C^{10}$ and the contact switch 34 on the nut is opened by the offset projection $c^{14}$ of the pointer block. At this point it may be stated that the actuation of the two electrical switches 38 and 34, respectively, in the manner and for the purpose just stated, also controls the energization and de-energization of the solenoid $C^{13}$ for resetting the space pointer $c^{21}$.

The angular stop element 36 (FIG. 10), for arresting the rotation of the lead screw $C^7$, is pivotally mounted between its ends and held normally by a pull spring 39 in its inactive position (FIG. 10) out of the path of the arm $c^9$ of the lead screw shaft $c^8$ before mentioned. Rocking of the stop element 36 to its active position is effected by the arm $c^{33}$ of a solenoid $C^{16}$, and the energizing of the latter is effected also by the closing of the same contact of the two-way switch 38 but is adapted to take place slightly before the solenoid $C^{15}$ is energized, so that the rotation of the lead screw $C^7$ will be stopped in its proper angular or start-line position before the pointer block $C^9$ is disengaged therefrom.

According to the present improvements, the means employed for measuring electronically the line remainder after a line is composed to the proper justifying length (FIGS. 10, 11 and 12) includes a reciprocable transparent grid plate D slidably mounted for horizontal movement in suitable guideways 40 and arranged directly in front of a similar stationary grid plate $D^1$ so as to move across the same during its reciprocal movements. The two plates D and $D^1$ are formed with vertical opaque markings d and $d^1$, respectively, spaced apart on an 18-unit basis, said plates being disposed in a space provided between a photo-electric cell $D^2$, located in front of the reciprocable plate D, and an incandescent lamp $D^3$ located behind the plate $D^1$. Normally, the grid plate D is held yieldingly against a stop pin 41 under the influence of a pull spring $d^2$ with the opaque markings d thereon covering the transparent spaces between the opaque marking $d^1$ on the stationary grid plate $D^1$ so as to prevent the escape of the light rays from the lamp $D^3$ through the plate D.

The line remainder of course will vary according to the length of the lines composed or, as previously stated, when the line-length pointer $c^{11}$ registers with or passes the space pointer $c^{21}$. The line pointer $c^{11}$ then will be located in the justifying zone or that between the advanced space pointer $c^{21}$ and a zero mark (not shown) on the scale bar $C^8$. This mark, however, is exemplified or designated by a stationary gate contact plate 42, and when the reciprocable grid plate D occupies its inactive position shown in FIG. 10, an electrical switch $D^4$ carried thereby will be located in engaging relation to said contact plate. A second gate contact for the switch $D^4$ is provided by the offset flange or projection $c^{14}$ of the supporting block $C^9$ for the line-length pointer $c^{11}$ as it stops in the justifying zone. Operation of the reciprocable grid plate D is controlled by a rotary solenoid $D^5$ having an upright arm $d^3$ provided with an antifriction roller $d^4$ arranged to engage a depending projection $d^5$ of the grid plate.

After a line is completely composed and the end-of-line key is actuated, the solenoid $D^5$ is energized by a so-called auxiliary end-of-line relay 43 (indicated on the block diagram in FIG. 1) to impart the active stroke to the reciprocable grid plate D; and, as the latter starts to move, the switch $D^4$ at the leading end thereof will be closed momentarily by the first gate contact 42 in order, first, to sensitize the photo-electric cell $D^2$ and, then, to permit a multiplicity of light rays from the lamp $D^3$ to be directed thereto through the medium of the grid plates D and $D^1$ until the switch again is closed momentarily by its engagement with the second gate contact $c^{14}$. As a result of this operation, the light rays from the lamp $D^3$ are converted by the photo-cell $D^2$ into a corresponding number of electrical impulses (one for each unit measured), which are transmitted through a line remainder "pick-off" gate 44 (FIG. 1) to a computer and finally used in the justification of the composed line. As the switch engages the second gate contact $c^{14}$, the photo-cell $D^2$ is de-sensitized so that a true measure of the line remainder, as determined by the number of electrical impulses generated in the cell, is obtained. A yielding stop element 46 limits the active stroke of the grid plate D and, as the plate approaches said stop, it is adapted to close a contact of the two-way master switch 38 (before mentioned) which thereupon de-energizes the actuating solenoid $D^5$ for said plate and allows the latter to resume its normal position against the stop pin 41.

The justification computer includes a stepping switch or space totalizer 47 (FIG. 1), whereby the number of spaces between the words in a composed line are totalized, and a divider 48, wherein the number of electrical impulses from the photo-cell $D^2$ are divided by the number of word spaces, the "quotient" then being transmitted from the "divider" first to a justification storage unit 49 and thereafter through a character width gate 50 to a decoder 51 where it is stored on a relay tree in code form ready for use each time a word space is to be set up during the photographing period. If it should happen that one or more pulses remain as a fractional part of the "quotient," they will be added successively to those already in the spaces until they are exhausted. For example, if there should be, say, five left-over impulses, as a result of such computation, and which in the present instance represent respectively one-eighteenth part of an em, they will be distributed equally among the first five word spaces in the composed line before it is photographed. See the schematic illustration in FIGS. 1–B, 1–C and 1–D. The justification computer is of the well known binary type used in high speed electronically operated calculators and therefore requires no further explanation.

RECORDING AND RELEASING MECHANISM

Reference is now directed to FIG. 15, which shows schematically the "memory" unit and parts of the driving mechanism therefor. This unit temporarily stores character identification, character width, and control information in code form, on an endless magnetic tape E, such information being "written" across the width of the tape while the latter is at rest by a row of sixteen electro-magnets $E^1$ (writing heads) which are energized selectively according to any given character or space and intended, as previously stated, to magnetize small dot-like regions (not shown) on the outer surface of the tape. The first nine magnets $E^1$ (FIG. 1) are devoted to character identification, the next five to character width, and the last two to the space bar $a^1$ by way of a relay 52 and to the end-of-line key $a^2$ by way of relay 53, respectively.

The magnetic tape E inherently is self-sustaining and along its opposite edges it is perforated so as to engage a pair of spaced-apart sprocket rollers $E^2$ and $E^3$ which are rotatable independently by separate electro-mechanical drive trains, each adapted during successive cycles to cause an intermittent as well as a rapid advance movement of the tape. That is to say, as the characters and spaces of a line being composed on the typewriter A are recorded on the magnetic tape E through the selective charging of the electro-magnets $E^1$, the tape is advanced intermittently 1/16" by the sprocket roller $E^2$ until the line is completely composed. Then, as the end-of-line key $A^2$ is actuated, a rapid advance of the tape E by the roller $E^2$ is initiated by the charging of a relay 54 by the relay 53 (FIG. 1), in order to locate a following blank section of the tape in the proper "start-line" position adjacent the row of "writing" magnets $E^1$ where it is ready to receive the recordings for a second line as it is being keyboarded.

Immediately thereafter that section of the tape E bearing first "written" line, and which for the moment is in loop or festoon form, is rapidly advanced by the sprocket roller $E^3$ a definite distance to carry said line to the "reading" station where it is located adjacent another row of sixteen magnetic structures $E^4$ ("reading" elements) preparatory to a second intermittent advance of the tape by said sprocket roller. The rapid advance of the tape E at this time is initiated when a relay 55 (FIG. 1) is energized by the end-of-line relay 53; and the following intermittent advance of the tape is initiated and carried on by pulses from a timing generator 56, which makes one complete rotation for each character producing cycle. These pulses are released consecutively by a gate relay 57 associated with the generator and controlled from the relay 55 through an intermediate switch (not shown) and a "read" initiate relay 58. Subsidiary rollers $E^5$, associated with the sprocket rollers $E^2$ and $E^3$, hold the tape E constantly engaged therewith and are so arranged as to maintain two opposed loops or bulges therein that may take up a sufficient length of the tape to permit it to be rapidly or slowly advanced by either sprocket roller to the exclusion of the other. During the second intermittent advance of the tape E and as the magnetized recordings thereon pass the row of reading elements $E^4$, voltage pulses are induced in these elements, which after amplification are used in the output section of the improved machine, later to be described. A strong permanent magnet $E^6$ (FIG. 15), located directly above the sprocket roller $E^3$ and slightly beyond the row of reading elements $E^4$, is employed to erase or remove all traces of the dot-like recordings on the tape E as the second intermittent advance thereof is completed.

The drive assemblies for the two sprocket rollers $E^2$ and $E^3$ are identical in form and mode of operation. Therefore, only the assembly for driving the sprocket roller $E^3$ located at the reading station has been shown completely, although schematically, in FIG. 15, and a description of this assembly as well as the reference characters may apply to corresponding parts of the assembly for driving the sprocket roller $E^2$ insofar as the illustration permits. Thus, the shafts $E^7$ and $E^8$ for the rollers $E^2$ and $E^3$, respectively, are rotated in a clockwise direction by separate drive shafts 59 aligned therewith and connected to one end thereof by positive couplings 60. At their other ends, the shafts $E^7$ and $E^8$ are extended beyond the rollers $E^2$ and $E^3$ and carry pinions $E^9$ for imparting through gears 61, meshing therewith, rotary movements to stub shafts 62 which are provided with edge cams 63 arranged in operative relation to double contact control switches $E^{10}$.

A Geneva wheel $E^{11}$, formed with eight peripheral slots e, is included in the drive assembly for each of the two sprocket rollers $E^2$ and $E^3$, one of the Geneva wheels (the one not shown) being operable to cause the intermittent advance of the tape E past the row of "writing" elements $E^1$, and the other Geneva wheel $E^{11}$ being operable to cause the intermittent advance of the tape past the row of "reading" elements $E^4$. The step-by-step movement of the Geneva wheel $E^{11}$ is effected by successive complete revolutions of a spur gear 64 mounted on a lay shaft 65 and driven from a main drive shaft 66 by a smaller gear 67 through the medium of a slip clutch 68. As shown in FIG. 15, the gear 64 is provided with a stud 69 projecting laterally from one side face thereof and adapted, during each revolution of said gear, to engage one of the radial slots e in the Geneva wheel $E^{11}$ and apart a 45° turn thereto. As the spur gear 64 completes a revolution, it is stopped by an arm $E^{12}$ rising from a pivot rod $e^1$ and formed at its upper end with a lip $e^2$ normally disposed in the path of a second stud 70 projecting laterally from the opposite side face of the gear 64. A pull spring $e^3$ holds the arm $E^{12}$ yieldingly in such position and a trip magnet $E^{13}$ is employed to retract it. Energization of the magnet $E^{13}$ is effected intermittently by electrical impulses emanating from the gate relay 57, before mentioned, which is associated with the timing generator 56; whereas, energization of the corresponding magnet (not shown) associated with the drive assembly for the sprocket roller $E^2$ is effected by the intermittent closing of the electrical contact $14^a$ by the universal bar $2^a$, heretofore described, as a line is being composed on the typewriter. The step-by-step rotation of the Geneva wheel $E^{11}$ is transmitted to the drive shaft 59 for the sprocket roller $E^3$ by means of a gear set 71 and a one-way tooth clutch $E^{14}$, which latter is spring loaded for normal engagement and capable of turning said shaft in one direction only.

The driving assemblies for the two sprocket rollers $E^2$ and $E^3$ further include, respectively, a magnetic clutch $E^{15}$ and a stop device $E^{16}$. The magnetic clutches are mounted on the drive shafts 59 for the sprocket rollers and are adapted when energized to rotate said shafts at the proper speed to effect the rapid advance of the tape E toward the "writing" and the "reading" stations; while the stop devices serve positively to arrest such rotation of the drive shafts and in this way locate the tape lengthwise in the proper "start writing" and "start reading" positions. The two magnetic clutches $E^{15}$ each comprise generally a coil assembly drum $e^4$ idling on the associated drive shaft 59, a pair of contact slip rings $e^5$ for an electrical connection to said drum, a spur gear $e^6$ for rotating the drum and itself driven from the main drive shaft 66 through a gear train 72, a driving member $e^7$ attached to the gear $e^6$, and a disk-like member $e^8$ pinned to the drive shaft 59 and adapted when the coil assembly is energized to establish a driving connection between the clutch $E^{15}$ and the drive shaft 59. At such times, it may be mentioned that the spring loaded driving member of the one-way tooth clutch $E^{14}$ will be cammed out of its engagement with the driven member thereof and permit the latter to slip past it as the shaft 59 starts its rotation by the clutch $E^{15}$ in initiating a rapid advance movement of the tape E for the reasons already stated. The two magnetic clutches $E^{15}$ for the respective sprocket rollers $E^2$ and $E^3$ are energized almost simultaneously when the end-of-line key $a^2$ is actuated and the associated relay 53 (FIG. 1) is charged. At such times, the relay 53 is adapted, first, to close the "write" rapid-advance-initiating relay 54 and, a few seconds later, to energize the "read" rapid-advance-initiating relay 55.

Each of the two stop devices $E^{16}$ for arresting the rotation of the drive shafts 59 includes merely an electromagnet $e^9$ and an arm $e^{10}$ movable thereby into engaging relation to a stop element $e^{11}$ which is keyed or otherwise secured to the drive shaft and formed with a straight radially disposed banking surface $e^{12}$. As best shown in FIG. 15, the arms $e^{10}$ are arranged in a plane substantially at right angles to that of the shafts 59 and are hingedly mounted at one end on individual pivot rods $e^{13}$ spaced from said shafts. Normally the arms $e^{10}$ are held yieldingly by pull springs $e^{14}$ in their inactive position out of the path of the stop elements $e^{11}$; however, when the magnets $e^9$ are charged, the arms $e^{10}$ will be swung upwardly thereby against the tension of their springs and into the path of the stop elements $e^{11}$ so as to positively stop the rotation of the shafts 59 and thus locate the tape E properly in the start "reading" and start "writing" position.

If a mistake should happen to be made in composition as a line is being keyboarded, the corresponding recording on the tape E may readily be erased by striking the erase finger key $a^5$ which thereupon causes an erase relay 73 (FIG. 1) to be energized. As a result of such energization, the read initiate relay 58 will be de-energized temporarily but the end-of-line relay 53 will be charged and allowed to perform all of the rest of its functions. In addition, the erase relay 73 energizes the auxiliary end-of-line relay 43 as well as a relay 74 in the erase delay circuit so as to prevent the functioning of the magnets $e^9$ for two complete cycles of the tape E and at the same time prevent the deenergization of the magnetic clutches $E^{15}$ for driving the sprocket rollers $E^2$ and $E^3$. The relay 74 then de-energizes itself.

When composing lines shorter than the selected length, such as those occurring at the end of paragraphs, etc., the quad key $a^4$ is utilized and when actuated is adapted to energize a quad relay 75 (FIG. 1) which, in turn, energizes a non-justifying, minimum space units relay 76. As a result, the relay 76 sets up the appropriate minimum space signal so that, when the character width gate relay 50 is closed, the signal will be sent to the character width decoder 51. The closing of the gate relay 50 prevents the passage of information from the justification storage 49 to the decoder 51 and is accomplished by grounding certain contacts in said relay. The quad relay 75 also energizes the end-of-line relay 53 so that the latter may perform its normal functions; and when a signal from the end-of-line recording on the tape E is received by an amplifier relay 77, the latter sends out an electrical impulse to reset the minimum space relay 76 through the medium of the character width gate 50.

Figure 16:
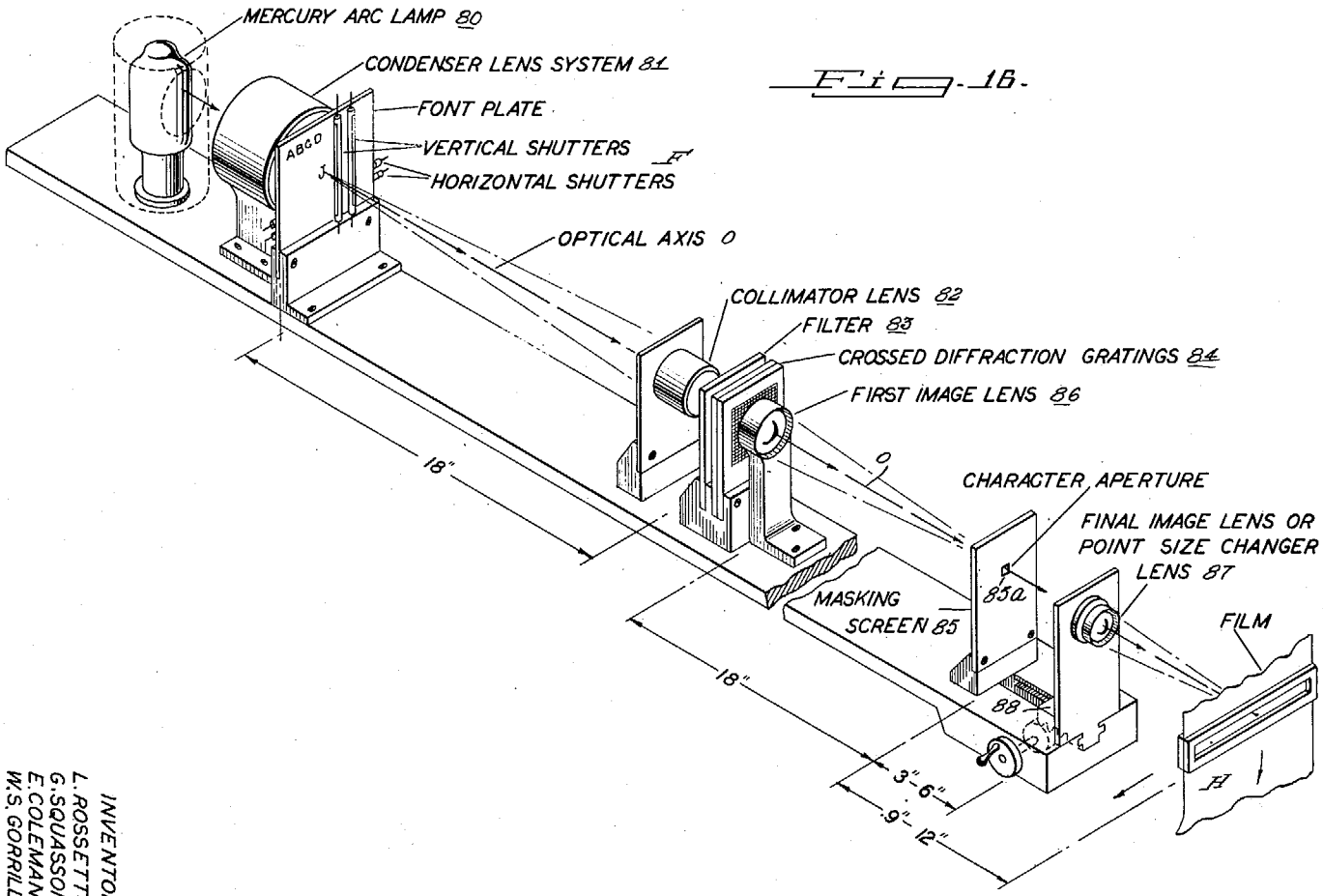
FIG. 16 is a perspective view showing schematically the optical system used in the improved machine, and the individual parts thereof appropriately labeled.

To complete the "memory" unit, a set of conventional amplifiers (represented by the three triangular blocks $78^a$, $78^b$ and $78^c$ in FIGS. 1 and 1–A), associated with the reading elements $E^4$ of said unit, is adapted to convert the small induced voltages therein to substantial electrical impulses for operating the various relays in the output section of the improved machine. Thus, the electrical impulses developed in this way for the identification of any selected character (block $78^a$) are transmitted to a decoder 79 where they are further amplified by pulses from certain commutator segments of the timing generator 56 and set up four relays of a tree in order to bring about the exposure of the desired character by operating a shutter assembly F which is located, as shown in FIG. 16, in the optical system of the improved machine. At the same time, the small voltages induced by the group of "reading" elements $E^4$ devoted to character width (block $78^b$), after being amplified, are converted into electrical impulses and transmitted to the decoder 51 before mentioned. Here, these impulses, like those for character identification, are further amplified from certain preselected commutator segments of the timing generator 56 so as to set up relays of a tree in the decoder, which are adapted to control the operation of a film carriage escapement device later to be described and which is indicated by a block labeled P in FIG. 1–A.

Electrical impulses are developed and amplified in like manner (triangular block $78^c$) from the small voltages induced by the single reading element $E^4$ devoted to the space bar $a^1$. These impulses also are transmitted to the decoder 51 where they too set up relays of a separate tree adapted to control, according to word spacing, the operation of the film carriage escapement device which is similar in all respects to the one (C) associated with the line indicator mechanism already described.

Amplified electrical impulses developed from the small voltages of the last "reading" element, and which are devoted to the end-of-line key $a^2$, are transmitted, after further amplification by pulses from the timing generator 56, to the decoder 51 and thence to the film carriage escapement device above referred to. In this connection, it may be mentioned that when the "read initiate" relay 58 (FIG. 1) is energized as a result of striking the end-of-line key $a^2$, it in turn energizes the gate relay 57 associated with the timing generator 56 and at such times the gate relay is adapted to remove the power from the end-of-line key as well as from the erase and quad keys during the reading cycle.

OPTICAL SYSTEM

The shutter assembly F (FIGS. 17 and 18) consists mainly of a set of sixteen rotatable vertically disposed drum-like shutters $F^1$ and a corresponding set of similar horizontally disposed shutters $F^2$ arranged in operative relation to the shutters $F^1$ but spaced sufficiently therefrom to permit the insertion of a font plate G between the two sets, said plate being provided (as indicated in FIG. 21) with an array of transparent characters g disposed in horizontal and vertical rows on an opaque background. At their opposite ends, the shutters in both sets are mounted in suitable bearing plates $F^3$ and $F^4$ of the assembly frame and are formed with longitudinal slots $f^1$ extending substantially throughout their length, so as to provide appropriate openings for exposures as well as intervening masking sections $f^2$ when the individual shutters are turned through 90° in opposite directions. To prevent the escape of light (provided by a mercury arc lamp 80) past the shutter assembly F during non-exposing periods, said assembly also includes fixed masking rods $f^3$ interspaced between the shutters $F^1$ and $F^2$. When any selected pair of shutters (i.e. one in each set) are turned to open position to expose a pre-selected character on the font plate G, light from the mercury lamp 80 will be confined to the space occupied by that character.

Turing of the two selected shutters $F^1$ and $F^2$, in the manner and for the purpose just stated, is accomplished by the energization simultaneously of separate electromagnets $f^4$ (FIG. 17) associated with the shutters, such energization, in the present instance, being effected by two electrical impulses which are directed to each of said magnets in rapid succession from the tree of the decoder 79. As best shown in FIGS. 19 and 20, suitable linkage is employed for connecting the individual shutters $F^1$ and $F^2$ to the arms of their respective magnets $f^4$, said linkage including a reciprocable plunger $f^5$ slidably mounted in tubular projections $f^6$ of the framework and operable against the tension of a compression spring $f^7$ by the pivoted arm $f^8$ of the associated magnet $f^4$.

The plunger $f^5$ (FIG. 17) is disposed in a plane at right angles to the font plate $G^1$ and preferably in line with the axis of the adjoining shutter so that it may actuate the latter through the medium of a connecting link $f^9$ which is attached off-center to one end thereof.

The arrangement is such that when a magnet $f^4$ is energized by the first impulse from the decoder 79 in the manner above stated, the magnet arm $f^8$ will be swung away from its normal position out of contact with a stop pin $f^{10}$ and actuate the spring plunger $f^5$. As a result, the shutter will be turned in one direction past dead center by the connecting link $f^9$ from the position shown in FIG. 19 to that shown in FIG. 20. Then, as the magnet $f^4$ is de-energized, the spring plunger $f^5$ is allowed to act in order to complete the 90° turn of the shutter to its open position as indicated by dotted lines in FIG. 20. These operations are repeated by the second impulse from the decoder 79 which again energizes the magnet $f^4$ so that the latter through the plunger $f^5$ and link $f^9$ will turn the shutter in the opposite direction sufficiently far to permit it to regain its normal position under the influence of the plunger spring $f^7$.

The image of the character thus selected on the front plate G by operation of the shutter assembly F is projected by the condenser lens system 81 to a collimating lens component 82 of the optical system (FIG. 16) whereby the light rays from said character are rendered practically parallel. These rays then pass through a standard filter 83 and thence through a pair of crossed diffraction gratings 84 which are adapted to divide them in such manner that a single principal image as well as a multiplicity of higher order images are produced on a stationary masking screen 85 by means of a first image lens 86 associated with said gratings. In this way, a symmetrical array of several hundred images of the same character can be created and projected on a flat field with the central image always located squarely on the optical axis O of the optical system. The masking screen 85 is formed with an aperture 85$^a$ located in line with the optical axis so that the single central image of the selected character may be photographed on a film H through the medium of a final image or point size changer lens 87.

The film H (FIG. 22) is mounted in a carriage J movable intermittently in a horizontal plane across the optical axis O, and the lens 87 is mounted in a supporting slide 88 capable of adjustment to locate said lens in different positions along the optical axis in order to change the point size of the characters on the film, as desired. The means employed for effecting the adjustments of the supporting slide 88 (FIGS. 16 and 22) consists merely of a pinion 89 arranged in mesh with a rack 88$^a$ at the lower end of the slide 88, and which is rotatable in opposite directions by a dial or hand wheel 90.

FILM CARRIAGE AND OPERATING MECHANISM

Figure 22:
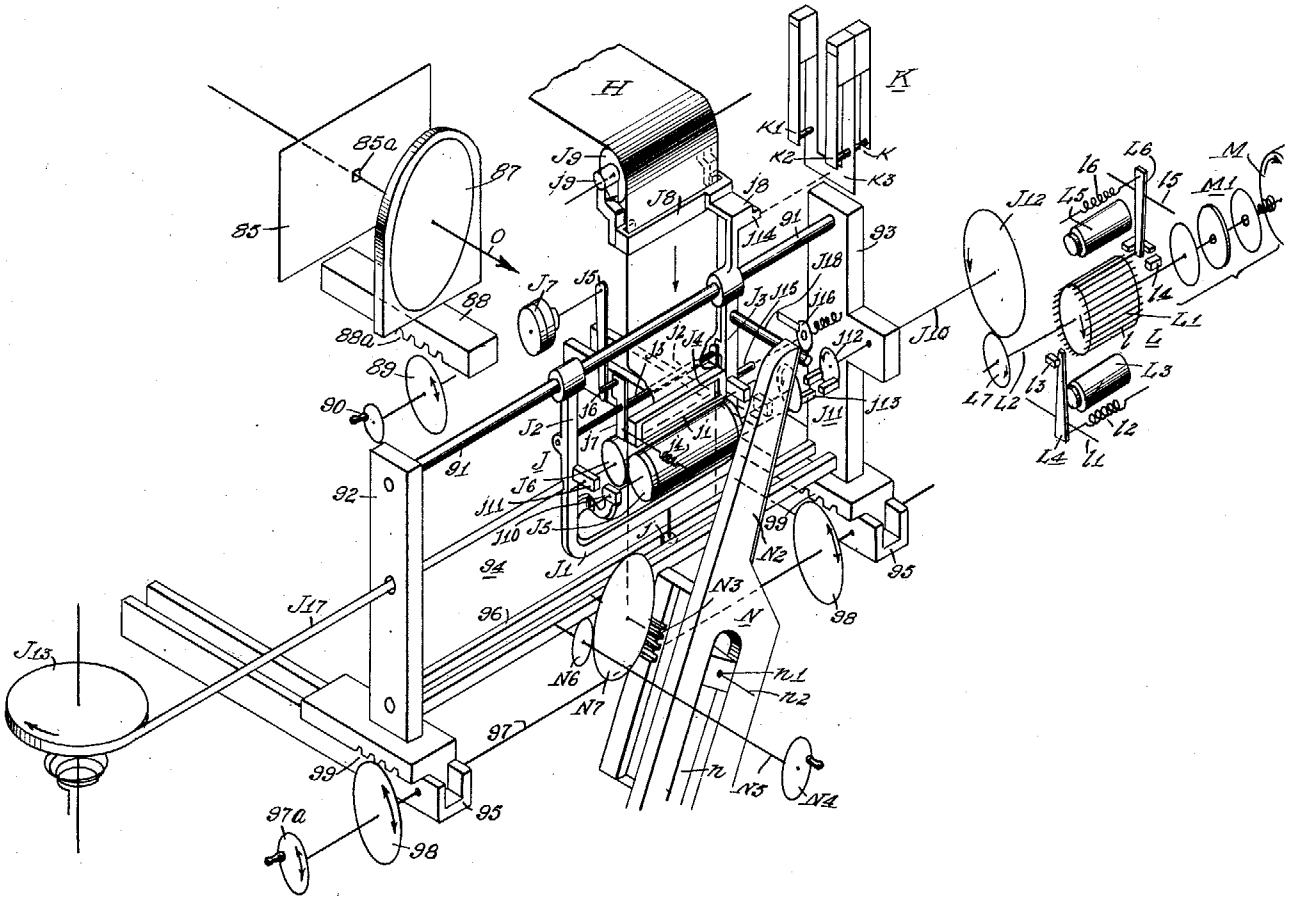
FIG. 22 is a perspective view showing schematically the carriage advance and film feed mechanisms.

As best shown schematically in FIG. 22, the film carriage J includes a U-shaped film holder $J^1$ which is suspended by means of its side arms $J^2$ and $J^3$ from a fixed horizontally disposed guide rod 91, and which is movable endwise therealong during each photographic cycle to carry the film H through the focal plane of the final image lens 87 and thence back to its normal or start-line position. The guide rod 91 is mounted at its opposite ends in upright post members 92 and 93 of a supporting frame structure 94, and the latter in turn is supported in fore-and-aft channel bars 95 of the machine framework so that it may be set properly, at the time of assembly, in relation to the optical system and other proximal parts of the improved machine. The means employed for this purpose includes a horizontal shaft 97 mounted near its opposite ends in the channel bars 95 and provided with two pinions 98 located adjacent said bars and arranged in mesh with corresponding racks 99 which are formed on the base portions of the upright post members 92 and 93. The shaft 97 also is provided with a hand wheel 97$^a$ whereby the shaft may be turned in one direction or the other, and, through the racks 99 and pinions 98, bring about the settings of the frame structure 94.

To hold or restrain the film carriage J against facewise displacement and at the same time maintain it in a truly vertical position during its endwise movement, it is provided with an anti-friction roller j depending from the cross bar of the U-shaped film holder $J^1$ and arranged to ride between the side walls of a horizontal channel 96 of the frame structure 94. This film carriage J further includes a film clamping device [J4] $J^4$ and a pair of film feed rollers $J^5$ and $J^6$ for moving the film H vertically downward for line spacing after each exposure and after the carriage has been restored to its normal or start-line position. One jaw $j^1$ of the clamping device $J^4$ is fixed while the other or rear jaw $j^2$ thereof is mounted on a pivot rod $j^3$ so that it may be rocked in opposition to a pull spring $j^4$ out of contact with the film H preparatory to the downward movement thereof by the feed rollers $J^5$ and $J^6$. Such rocking movement of the jaw $j^2$ is effected by the charging of a rotary solenoid $J^7$ having a vertical arm $j^5$ depending therefrom and terminating in engaging relation to a stud $j^6$ which is disposed above the pivot rod $j^3$ and projects laterally from one of two end plates $j^7$ attached to the film clamping jaw $j^2$. In order to permit the exposure of the film H during the intermittent advance of the carriage J, the rear jaw $j^2$ of the film clamping device $J^4$ is formed with an elongated rectangular opening or window (not shown) but through which the characters of a line during composition are reproduced one after another on the film as it is carried past the final image lens 87. The upper portion of the vertical stretch of the film H (FIG. 22) in the vicinity of the carriage J is properly guided by a horizontal strap $J^8$ attached to an upward angular extension $j^8$ of the film holder $J^1$. The strap $J^8$ serves also to sustain, through brackets $j^9$, an idler $J^9$ adapted to support a horizontal stretch of the film and direct it downwardly through said strap to the clamping device $J^4$ and the feed rollers $J^5$ and $J^6$.

As best shown in FIG. 22, both film feed rollers $J^5$ and $J^6$ are mounted in suitable bearing brackets $j^{10}$ and $j^{11}$, respectively, of the film holder $J^1$ and the rotation thereof to advance the film is effected by the successive partial rotations of a horizontal shaft $J^{10}$ journalled in the upright post 93 of the frame structure 94 and provided with one member $j^{12}$ of a clutch $J^{11}$. The other member $j^{13}$ of the clutch $J^{11}$ is pinned to the shaft of the front film feed roller $J^5$ and, as the carriage during its return movement approaches the start-line position, the two clutch members $j^{12}$ and $j^{13}$ are adapted to intermesh so that the partial rotations of the shaft $J^{10}$ may be imparted to the roller $J^5$ and thence through a pair of gears (not shown) to the other film feed roller $J^6$, while the carriage is momentarily stopped in the start-line position. In this way, the film H will be moved the proper distance downwardly for line spacing and held ready to receive the first character of the next line. Meanwhile, however, the solenoid $J^7$ will have been charged by the closing of a single contact k of a triple contact switch K, in order to open the rear jaw $j^2$ of the clamping device $J^4$ in the manner stated and thus release the film H preparatory to its downward movement by the feed rollers $J^5$ and $J^6$. As the contact k is closed, the other two contacts $k^1$ and $k^2$ of the switch K are opened to permit the next advance of the film carriage J for character exposure. The opening and closing of the contacts k, $k^1$ and $k^2$ of the switch K is accomplished by means of a lip $j^{14}$ protruding from the angular extension $j^8$ of the film holder $J^1$ and arranged to engage and actuate a resilient control member $k^3$ of the switch as the film carriage J is moved to and from its line advance or start-line position. A stud $j^{15}$, projecting laterally from the vertical side arm $J^3$ of the film holder $J^1$ and directly opposed to a cushion stop element $j^{16}$ mounted in the post member 93 of the frame structure 94, serves to locate the carriage in its start-line position.

The partial rotations of the horizontal shaft $J^{10}$ are imparted thereto by the operation of an electro-magnetic escapement device L (FIG. 22) having a rotatable drum $L^1$ of the "squirrel cage" variety, which in turn is mounted on another horizontal shaft $L^2$ and driven from an electric motor M through the medium of a slip clutch $M^1$. However, unlike the escapement device C associated with the line indicator mechanism hereinbefore described, the device L has but one indexing magnet $L^3$ and this magnet is capable of being adjusted to different angular positions about the drum $L^1$ by means of a dial (not shown) whereby it may cause the actuation of one or another of, say, twenty-five slide elements l mounted for endwise movement in adjacent longitudinal slots formed in the outer surface of the drum. The magnets $L^3$ (FIG. 22) is disposed in operative relation to a vertical actuating arm $L^4$ mounted between its ends on a fore-and-aft pivot rod $l^1$ and directly opposed at its upper end to a selected slide l. At its lower end, the arm $L^4$ is provided with a pull spring $l^2$ for holding it normally against a stop $l^3$, but when the magnet $L^3$ is energized (by the closing of the single contact k of the start-of-line switch K), said arm will be actuated thereby and project the opposed slide l of the drum L sufficiently far therefrom to enable it to engage another stop element $l^4$ when a partial turn is imparted to the drum by means of the slip clutch $M^1$. At the same time, a relatively fixed magnet $L^5$, disposed above the drum $L^1$, is energized in like manner so as to cause the release of the drum preparatory to another partial rotation thereof. The means employed for this purpose includes a vertically disposed arm $L^6$ associated with the release magnet $L^5$ but which depends from a pivot rod $l^5$ and is operable by said magnet in opposition to a pull spring $l^6$ to push a slide l, previously selected by the corresponding arm $l^4$ of the indexing magnet $L^3$ out of engagement with the stop element $l^3$ and thus allow the drum $L^1$ to be given another partial turn through the same number of degrees by the motor M and the slip clutch $M^1$. During the time the film carriage J in its start-line position and the film clamping device $J^4$ is open, each partial turn of the drum $L^1$ will be imparted to the horizontal shaft $J^{10}$ before mentioned, and thence to the film feed rollers $J^5$ and $J^6$, by means of a pinion $L^7$ keyed or otherwise secured to the drum shaft and arranged in mesh with a much larger gear $J^{12}$ similarly mounted on the shaft $J^{10}$. Consequently, the film H will be advanced step by step the proper distance for line spacing, as determined by the angular position which the pre-set magnet $L^3$ and parts associated therewith happen to occupy in relation to the stop element $L^4$ as well as to corresponding parts associated with the relatively fixed release magnet $L^5$.

As indicated in the wiring block diagram of FIG. 1–A, the closing of the contact k of the start-of-line switch K by the film carriage J, when the latter is stopped in its start-line or film advance position, first charges a so-called "film gate relay" 100 which in turn energizes the rotary solenoid $J^7$ (labeled "film gate solenoid") and then, through an electrical circuit that includes a condenser and is labeled "time delay," also energizes both electro-magnets $L^3$ and $L^5$ of the "line advance" escapement assembly L.

In the improved machine (FIGS. 22 and 24), the intermittent advance of the film carriage J for character and word spacing is effected by a stationarily mounted spring drum $J^{13}$ connected by an intervening band or belt $J^{17}$ to the film holder $J^1$; and to control the advance movements of the carriage and thereafter restore it to its starting position, a vertically disposed sine bar N is employed, which bar is fulcrumed at its lower end in a slide bracket $N^1$ and formed at its upper end with a finger-like extension $N^2$ normally engaging a stud $J^{18}$ projecting forwardly from the film holder. Between its ends, the sine bar N is formed with an elongated longitudinal slot n adapted to accommodate a swivel pivot block $n^1$ which is mounted on the free end portion of a stub shaft or stud $n^2$ that projects forwardly from a rack bar $N^3$ and passes through the slot in the sine bar, as shown best in FIG. 22. The fulcrum bracket $N^1$ for the sine bar N is restrained to move to and fro in a horizontal plane upon a pair of similarly disposed spaced-apart guide rods $n^3$ in order to impart a longitudinal movement to the sine bar in relation to the pivot block $n^1$ while it is performing its functions. As a result, the leverage of the sine bar N will be constant and will accurately control the intermittent advance movements of the film carriage J so that the character width selected as well as word spacing will always be maintained irrespective of the angular positions said bar is caused to assume at such times. Moreover, whenever, it is desired to change the point size of the characters reproduced on the film H in the manner already described, the intermittent movements of the carriage J and sine bar N must also be changed for character width and word spacing. To this end, the rack bar $N^3$ is slidably mounted in the machine framework for endwise adjustment to set the pivot block $n^1$ at different levels in the longitudinal slot n of the sine bar N. Such adjustments of the rack bar $N^3$ are effected by a simple assembly which includes a conveniently located hand wheel wheel or dial $N^4$ fastened to the front end of a fore-and-aft shaft $N^5$, a pinion $N^6$ keyed or otherwise secured to said shaft and a much larger gear $N^7$ arranged in mesh with both the pinion $N^6$ and the rack bar $N^3$. Thus, by turning the hand wheel $N^4$ in a clockwise direction, the pinion $N^6$, through the medium of the gear $N^7$, is adapted to raise the rack bar $N^3$ and elevate the pivot block $n^1$ in the longitudinal slot n of the sine bar N, thereby decreasing the movements of the film carriage J for character width and word spacing; and conversely, when the hand wheel $N^4$ is turned in the opposite direction, the pivot block $n^1$ will be lowered in the slot n so as to increase the intermittent movements of the film carriage. As indicated in FIG. 22, the rack bar $N^3$ stands at an angle corresponding to that of the sine bar N when the latter has restored the film carriage J to its start-line position. Consequently, at such times the setting of the pivot black $n^1$ may be conveniently made without interrupting a complete cycle of the film carriage. Also, to facilitate the operation of the sine bar N as it is moved intermittently along the guide rods $n^3$ by the spring drum $J^{13}$ and [particular] *particularly* as it approaches dead center, there is employed a second spring drum $J^{14}$ (FIG. 24) which is connected by a band or belt $n^4$ to the supporting slide bracket $N^1$ for said bar and tends to supplement the spring tension of the carriage advancing drum.

Reference now is directed to FIG. 23 which shows schematically the film carriage escapement and reset assemblies as well as intervening gear and clutch mechanism for operating them. The film carriage escapement includes a "squirrel cage" drum P keyed or otherwise secured to a fore-and-aft shaft $P^1$ and driven from an electric motor $P^2$ through the medium of a slip clutch $P^3$. Like the drum associated with the line indicator mechanism hereinbefore described, the drum P in its outer surface is slotted longtiudinally so as to accommodate a series of twenty-five equally spaced-apart slides p movable individually endwise to and from active position. Also, the actuation of the slides p is accomplished by the selective energization of one or another of a series of twenty-four electro-magnets $P^4$ disposed concentrically about the axis of the drum P with their pivoted arms $p^1$ arranged respectively in engaging relation to the protruding ends of a corresponding number of the slides p. The arms $p^1$ of these so-called indexing magnets are controlled by pull springs $p^2$ which hold them yieldingly against stop pins $p^3$ in proper spaced relation to the magnet cores for operation thereby. In other words, when one of the magnets $P^4$ is energized, the slide p that happens to be associated therewith will be projected rearwardly by the magnet arm $p^1$ sufficiently far beyond the drum P to engage a fixed stop element $p^4$ as the drum is rotated and thus positively arrest the latter in a corresponding angular position representative of the total number of units the film carriage is to be advanced. At such time, the rear end of the arresting slide p will also be located directly in front of the arm $p^5$ of a single release magnet $P^5$ adapted to function substantially in synchronism with the charging of the magnet $P^4$ next selected, so as to push said slide forwardly out of engagement with the stop element $p^4$ back to its normal position and thereby permit another partial rotation of the drum P. The arm $p^5$ of the release magnet $P^5$ is controlled by a pull spring $p^6$ and held yieldingly thereby against a stop pin $p^7$ in proper spaced relation to the core of the release magnet.

In order that the partial rotations of the escapement drum P may accurately determine the intermittent advance movements of the film carriage J, the shaft $P^1$ of the drum P (FIG. 23) is operatively connected to the sine bar N, previously described, through the medium of a gear shift assembly which includes in part a tooth clutch Q and a fore-and-aft drive shaft $Q^1$ whereon the clutch is mounted. The clutch Q comprises two clutch members $q^1$ and $q^2$, the former being pinned to the shaft $Q^1$, and the latter being secured to the rear side of a spur gear $Q^2$ mounted to rotate on said shaft and also capable of facewise movement thereon under the control of a rotary solenoid $Q^3$. That is to say, when the solenoid $Q^3$ is energized, it is adapted by means of a forked lever $Q^4$ to shift the gear $Q^2$ forwardly against the influence of a compression spring $q^3$ and thus disengage the clutch Q; and conversely, when the solenoid is de-energized, the spring $q^3$ will act to shift said gear rearwardly to re-engage the clutch. Energization of the solenoid $Q^3$ is effected by the closing of an electrical circuit from the amplifier "end-of-line" relay 77, hereinbefore mentioned, through a "tooth clutch relay" 101 (block diagram, [FIGS.] *FIG.* 1–A), and the de-energization of said solenoid is caused by the opening of the two normally closed contacts $k^1$ and $k^2$ of the switch K as the film carriage J is restored to the "start line" station.

The spur gear $Q^2$ is rotated by an elongated pinion $Q^5$ keyed to a lay shaft $Q^6$ and the latter is driven from a shaft $Q^7$ which in turn is connected by a flexible coupling $Q^8$ to the shaft $P^1$ of the escapement drum P. Rotary movements of the drum shaft $P^1$ are imparted to the lay shaft $Q^6$ by means of a relatively small gear $q^4$ keyed to the shaft $Q^7$ and arranged in mesh with a larger gear $q^5$ likewise keyed to the lay shaft. Near its front end, the clutch drive shaft $Q^1$ is further provided with a pinion $q^6$ adapted while the clutch Q is engaged to transmit, through the medium of a larger gear $Q^9$ and a flexible shaft coupling $q^7$, the partial rotations of said drive shaft first to a cable drum R and thence by a short length of cable r to the supporting slide bracket $N^1$ for the sine bar N.

As indicated in FIG. 23, the cable drum R is mounted on a fore-and-aft shaft $R^1$ which is journalled in suitable supporting brackets of the machine framework and which, for reasons about to be pointed out, is also provided with a belt drum $R^2$ and a precision stop device $R^3$ (yet to be described). In order to provide for individual rotational adjustment of the drums R and $R^2$ in relation to the shaft $R^1$ and the stop device $R^3$ at the time of assembly, each is provided with a concentrically slotted plate $r^1$ fastened thereto and keyed or otherwise secured to said shaft. It also may be mentioned that the advance speed of the film carriage J may be increased, if desired, by a rearward endwise adjustment of the lay shaft $Q^6$ while the machine is at rest. Such adjustment is effected by means of a knob or handle $q^8$ and is adapted to break the engagement between the gears $q^4$ and $q^5$, and at the same time establish a driving engagement between a pair of smaller supplemental gears $q^9$ and $q^{10}$ also mounted respectively on the shafts $Q^6$ and $Q^7$.

It should now be clear that when the tooth clutch is engaged, the partial rotations of the escapement drum P, as permitted by the selective energization of the electromagnets $P^4$, will control through the intervening connections already described the intermittent advance movements of the film carriage J under the influence of the spring drums $J^{13}$ and $J^{14}$. Then as the film carriage completes its advance movements and the end-of-line relay 53 (FIG. 1) is energized, the clutch Q will be disengaged in order to permit the restoration of the carriage to its start-line position. The latter operation is effected by the momentary engagement of a friction clutch S (FIG. 23) controlled by a rotary solenoid $S^1$ and mounted on a shaft $S^2$ which is parallel to the fore-and-aft shaft $R^1$ and driven from an electric motor $S^3$ through the medium of a coil spring $S^4$. One member s of the clutch S is connected by a stretch of belting $s^1$ to the drum $R^2$, and the corresponding member $s^2$ thereof is directly opposed to the lower arm of a vertically disposed lever $S^5$ secured between its ends to the shaft of the solenoid $S^1$. A pull spring $s^3$ holds the lever $S^5$ in its normal position against a stop $s^4$ with its upper arm disposed in engaging relation to an electrical switch $S^6$ and interlock (not shown) associated with the solenoid $S^1$. The arrangement of the parts is such that when the tooth clutch Q is disengaged in the manner already stated, the solenoid $S^1$ will be energized by the tooth clutch relay 101 (FIG. 1–A) and through the lever $S^5$ effect the engagement of the friction clutch S. The intermediate shaft $R^1$ and cable drum R then, and as permitted by the flexible shaft coupling $q^2$, will be rotated by the belt drum $R^2$ in the opposite direction indicated by arrows in FIG. 23. As a result, the supporting slide bracket $N^1$ for the sine bar N will be pulled sufficiently far against the tension of the spring drums $J^{13}$ and $J^{14}$ of the film carriage J to effect its return to the start-line position, where it is properly located by the precision stop device $R^3$. For the sake of clarity, it may be mentioned that the closing of the electrical switch $S^6$ of the lever $S^5$ is intended to delay slightly the de-energization of the solenoid $S^1$ in order to maintain the engagement of the friction clutch until the driving member $q^2$ of the tooth clutch Q is completely engaged with its component. A pair of diametrically disposed compression springs arranged between the two members s and $s^1$ of the friction clutch S insures a quick, clean disengagement thereof when the solenoid $S^1$ is de-energized. It also may be mentioned that the relay 101 itself is energized as indicated in the electrical block diagram (FIG. 1) from the end-of-line relay 53 through the amplifier 77 which in turn will have de-energized the "read initiate" 58 and also the gate relay 57 so as to disconnect certain commutators of the timing generator 56, from the three amplifiers 78[a], 78[b] and 78[c] associated therewith.

As shown best in FIG. 25, the precision stop device $R^3$ is located immediately adjacent the belt drum $R^2$ and includes a rectangular block-like member $R^4$ which has a threaded engagement with the front end portion of the shaft $R^1$ so as to be movable backwardly and forwardly therealong as said shaft is rotated in opposite direction. The member $R^4$ of the stop device is mounted to slide upon a stationary support plate $R^5$ and is properly guided in its fore-and-aft movements by means of a tongue and groove connection $r^2$ with said plate. When the shaft $R^1$ is rotated in a clockwise direction by means of the belt drum $R^2$ during the return movement of the film carriage J by the sine bar N (multiplier arm), the member $R^4$ will be fed rearwardly along the threaded portion of the shaft $R^1$ so as to carry a stop finger $r^3$ projecting from its rear side face into the path of a corresponding finger $r^4$ which projects forwardly from a disk $R^6$ secured to the opposing side face of the belt drum. Then, as the film carriage J arrives at the start-line station, the finger $r^4$ is adapted to bank against the stop finger $r^3$ and, through the intervening connections already described, locate the film carriage in its start-line position. On the other hand, when the shaft $R^1$ is rotated in a counter-clockwise direction while the intermittent advance of the film carriage takes place under the control of the cable drum R, the finger $r^4$ during the first revolution of said shaft, will be carried out of engagement with and clear the stop finger $r^3$ as the block-like member of the stop device $R^3$, due to its threaded engagement with the shaft $R^1$, is caused to move forwardly upon its supporting plate $R^3$.

CONCLUSION

No further description of the various organs of the improved machine by way of recapitulation seems to be necessary. The opening statement gives a fairly complete description of the operation and might advantageously be re-read at this point.

In its broader aspects, the invention comprehends the use of a perforated tape, in lieu of the magnetic tape described, for the code assignments or signals, and also the separation of the composing unit from the photographic unit, such separation being especially contemplated with the use of a perforated tape.

What is claimed is:

1. In a photocomposing machine, the combination of an electric composing unit and mechanism associated therewith for indicating the length of a composed line, said mechanism including an elongated graduated scale reading from right to left, a line length pointer and a separate space pointer cooperating therewith, the line length pointer being movable from left to right along the scale and the space pointer being movable from right to left along the scale, individual spring controlled supporting slides for the pointers movable intermittently toward each other along the scale as a line is being composed, and electrical means controlled by the actuation of a finger key after a line is completely composed for measuring the remaining justifying space indicated by the space pointer and which must be added to the composed line to bring it to the proper length, togther with a justification computer and storage unit responsive to said electrical measuring means for computing and storing said justification space information for use in photographing a justified line.

2. A combination according to claim 1, wherein said measuring means includes a spring controlled reciprocable grid, a contact switch carried thereby, a photo-electric cell, and a rotary solenoid for actuating the grid, whereby the switch through its engagement with the line length pointer slide in its different end of line positions may be operated to close a computing circuit for dividing the number of electrical impulses generated in the cell into cycles for word spacing, preparatory to justification.

3. A combination according to claim 2, including a lamp and a stationary grid associated with the reciprocable grid and wherein both grids are transparent with corresponding equally spaced-apart opaque markings and are arranged between the lamp and the photo-electric cell so that when the reciprocable grid is actuated and the opaque markings theron first register with and then pass those on the stationary grid, the required number of electrical impulses will be generated in the cell for use in justifying composed lines of different lengths.

4. A combination according to claim 2, including a justification computer having circuits controlled from the space bar of the keyboard and the end-of-line key for totalizing the number of spaces in each composed line, and wherein the number of photo-electric cell impulses in each cycle is determined by the number of word spaces in a composed line.

5. A combinaiton according to claim 2, including a normally open gate relay associated with the photo-electric cell, and a stationary gate piece for operating the contact switch as the grid starts its active stroke so as to close said relay and thus permit the pulses from the photo-electric cell to enter the justification computer.

6. A combination according to claim 2, wherein the photo-electric cell normally is de-sensitized and including a stationary gate contact for closing said switch momentarily to sensitize the cell as the reciprocable grid starts its active stroke, and a second gate contact movable with the line-length pointer slide for again closing the switch to de-sensitize the photo-electric cell.

7. A combination according to claim 1, including electrically actuated means for advancing the supporting slide for the space pointer against spring tension during composition of a line and then releasing it preparatory to the composition of the next line.

8. In a photocomposing machine, the combination of [and] *an* electric composing unit and mechanism associated therewith for indicating the length of a composed line, said mechanism including an elongated graduated scale, a line length pointer and a separate space pointer cooperating therewith, individual spring controlled supporting slides for the pointers movable intermittently toward each other along the scale as a line is being composed, a power driven lead screw for advancing the supporting slide for the line length pointer in opposition to its control spring during composition, a rotary solenoid for disengaging said slide from the lead screw to permit its restoration to normal position by the control spring, a spring controlled reciprocable grid, a second rotary solenoid for actuating the grid, and a limit contact switch operable by the grid as it completes its active stroke for energizing the first solenoid and de-energizing the second solenoid simultaneously.

9. A combination according to claim 8, including means controlled by a third rotary solenoid for positively stopping the rotation of the lead screw as the supporting slide for the line length pointer is restored to its normal position, and wherein the energizing of the third solenoid is effected by the operation of the limit contact switch for the reciprocable grid.

10. A combination according to claim 9, including a manually rotatable lead screw, a pre-set banking nut adjustably mounted thereon to locate the supporting slide for the line length pointer in its starting position, and a contact switch attached to the banking nut and operable by said slide to de-energize both the first and third solenoids and thus permit the slide to re-engage the power driven lead screw as well as permit the rotation of said screw during line composition.

11. In a photocomposing machine, the combination of an electric composing unit and mechanism associated therewith for indicating the length of a composed line, said mechanism including an elongated graduated scale, a line length pointer and a separate space pointer cooperating therewith, individual spring controlled supporting slides for the pointers movable intermittently toward each other along the scale as a line is being composed, a power driven lead screw for advancing the line length pointer slide in opposition to its control spring, an electromagnetic escapement unit controlled from the keyboard of the composing unit for limiting the extent of rotation of the lead screw according to the width of the individual characters selected during line composition, and electrically actuated means also controlled from the keyboard of the composing unit for effecting the advance movements of the space pointer slide and to thereafter release it for a return to normal position.

12. A combination according to claim 11, wherein the space pointer slide is formed with a series of closely spaced-apart ratchet teeth, and wherein the electrically actuated means includes an advancing pawl and a retaining pawl normally engaging the teeth of said slide, an indexing solenoid for operating the advancing pawl, and a separate solenoid operable to disengage both pawls from the slide to effect its release.

13. A combination according to claim 11, including a reciprocable spring controlled grid operable electrically after a line is completely composed to measure the space indicated by the space pointer, and a contact limit switch operable by the grid as it completes its active stroke for causing the release of both the grid and the space pointer supporting slide simultaneously.

14. A combination according to claim 11, wherein the escapement unit includes a rotatable power actuated drum, a series of closely spaced-apart slides arranged longitudinally of the drum and disposed about the outer surface thereof, a corresponding series of magnets for actuating the slides and a single magnet for resetting them after actuation; and wherein the composing unit is provided with a coding system which includes a character width coding section and contact switches associated therewith, whereby the width of selected characters or spaces is transmitted in code form to the escapement unit so as to energize corresponding magnets located therein.

15. In a photocomposing machine, the combination with a keyboard actuated composing unit for producing a coded tape, electrical means controlled from the keyboard for recording character width, word space and character identification signals in the coded tape as a line is being keyboarded, a photographic unit, and electrical means responsive to the signals in the coded tape for photographing the composed line on a light sensitive film, characterized in that the two said electrical means include a common endless magnetic tape, a pair of spaced-apart sprocket rollers over which the tape is successively passed, separate driving means for the sprocket rollers to intermittently advance the tape as a line is being composed, a writing head for magnetically recording on the tape the code signal for each character or space, a reading head for releasing electrically such recorded information, and supplemental driving means responsive to the actuation of an end-of-line key for each of said rollers whereby the tape is advanced more rapidly and to a sufficient extent to locate the code signal for the first character in the recorded line into recoding relation to the reading head preparatory to the intermittent advance of the tape for the composition of the following line.

16. A combination according to claim 15, wherein the composing unit includes a universal bar operable as a character or word space is keyboarded to close momentarily an electrical contact and through the resultant current pulse cause the normal or intermittent advance of the magnetic tape past the writing head.

17. A combination according to claim 15, wherein the driving assembly for at least one of the sprocket rollers includes a drive shaft, a magnetic clutch mounted thereon, a key controlled contact switch for energizing the clutch to effect the rapid advance of the tape, a magnet-controlled stop device for positively arresting the rotation of said shaft in order to locate the tape in its advanced position, and a contact limit switch operative to de-energize the magnetic clutch and energize the magnet of the stop device simultaneously.

18. A combination according to claim 17, wherein said stop device includes a shouldered cam element pinned to the drive shaft and a spring controlled arm movable by the magnet into engaging relation to the cam element.

19. A combination according to claim 15, wherein the driving means for each sprocket roller includes a Geneva wheel geared to the shaft of at least one of said rollers, an electric motor, a slip clutch, a spur gear rotatable from the motor shaft through said clutch for turning the Geneva wheel, and automatic means operable as each character or space is keyboarded to control the rotary movement of the spur gear.

20. A combination according to claim 19, wherein said automatic means includes a trip magnet, and a spring controlled rocker arm associated therewith for positively stopping the rotary movement of the spur gear, said arm being operable when the magnet is energized to release said gear momentarily and permit it to function.

21. In or for a photocomposing machine, an optical system equipped with a font plate centered on the optical axis of the optical system and having an array of typographical characters arranged in horizontal rows and vertical columns; and an electrically controlled shutter assembly for uncovering any pre-selected character on the font plate, said assembly comprising two sets of rotatable drums slotted longitudinally and disposed on opposite sides of the font plate, the drums of one set being arranged in horizontal rows corresponding to the horizontal rows of characters of the font plate, and the drums of the other set being arranged in vertical columns corresponding to the vertical columns of characters of the font plate.

22. A combination according to claim 21, wherein the drums in both sets are rotatable selectively through a given number of degrees in opposite directions so as to first uncover and then cover any particular character on the font plate, and including electro-magnetic devices for actuating the drums.

23. A combination according to claim 22, wherein said devices individually include an electro-magnet and spring actuated linkage controlled by the magnet arm and connected eccentrically to one end of the associated drum.

24. In a photocomposing machine, the combination of a film carriage for advancing the film intermittently to expose the individual characters of a composed line, a spring for propelling the carriage in its film advancing movement, a vertically disposed lever or sine bar for sustaining the carriage during its advance and operable to restore the carriage to its normal or start-of-line position, said sine bar being intermediately pivoted and having its upper end arranged in engagement with the carriage, an electro-magnetic escapement device under control of a coded tape, and mechanism controlled by said device for indexing the advance movements of the film carriage, said mechanism including a drive shaft, a lay shaft geared thereto, a driven shaft geared to the lay shaft, and a drum mounted on the driven shaft and operatively connected by a cable to the lower end of the sine bar, said drum in its rotation permitting the sine bar to rock about its pivot and its upper end to move in the direction of advance of the film carriage.

25. A combination according to claim 24, including an end-of-line key, a spring actuated tooth clutch mounted on the lay shaft and through which the driven shaft is rotated in the proper direction to control the advance movements of the film carriage, and electrical means controlled by a relay from the end-of-line key for disengaging said clutch and thus stopping the rotation of the driven shaft.

26. A combination according to claim 24, including a second drum mounted on the driven shaft, and a reset assembly for rotating said shaft in the opposite direction to restore the film carriage against the tension of its actuating spring to normal position, said assembly including a motor driven shaft, a friction clutch mounted thereon and operatively connected through a tape or belt to the second drum, and electrical means also controlled by a relay from the end-of-line key for effecting the engagement of the friction clutch.

27. A combination according to claim 26, wherein the electrical means for effecting the engagement of the friction clutch includes a rotary solenoid, and a safety interlock switch operable by the arm of the solenoid to prevent disengagement of the friction clutch until after the tooth clutch is fully engaged.

28. A combination according to claim 24, including a precision stop for positively arresting the rotation of the driven shaft in its carriage return movements so as to locate the film carriage through the medium of the sine bar in its line start position.

29. In a photocomposing machine, the combination of a film carriage for advancing the film intermittently during its exposure, a spring for propelling the carriage in its film advancing movements, a stationary supporting frame wherein the carriage is slidably mounted, a lever or sine bar for sustaining the carriage against the tension of its spring as it is advanced and operable to return the carriage to its normal or start-of-line position, a clamping device mounted on the carriage for flattening the film along the line of exposure, a precision stop for locating the carriage through the medium of said bar in its normal position, and electrically controlled film feed mechanism operative to advance the film for line spacing as the carriage completes its return movement.

30. A combination according to claim 29, wherein said film feed mechanism includes a pair of feed rollers, and wherein the clamping device is arranged in juxtaposition to said rollers and includes a stationary frame-like member extending transversely across one side face of the film, a similar spring actuated hinged member for clamping the film against the stationary member, and electrically controlled means operable to swing the hinged member in opposition to its actuating spring out of engagement with the film preparatory to its advance.

31. In a photocomposing machine, the combination of a spring actuated film carriage for advancing the film intermittently during its exposure, unitary means for sustaining the carriage against the tension of its spring as it is advanced and operable to restore the carriage to its normal position after the exposure, a clamping device mounted on the carriage for flattening the film along the line of exposure, a rotary solenoid operable to release the clamping device, and film feed mechanism operative to advance the film intermittently relatively to the carriage for line spacing when the clamping device is released, said mechanism including a pair of feed rollers associated with the clamping device, and an electro-magnetic escapement unit for effecting the advance of the film through the medium of said rollers.

32. A combination according to claim 31, wherein one of the film feed rollers is rubber surfaced and the shaft of said roller is provided with a coupling member rotatable through a given number of degrees by the escapement unit when the carriage is restored to normal position.

33. A combination according to claim 31, wherein the film clamping device includes a stationary member and a spring actuated hinged member for holding the film against the stationary member, and wherein the solenoid is operatively connected to the hinged member.

34. A combination according to claim 31, wherein the electromagnetic escapement unit includes a manually adjustable indexing magnet and a relatively fixed reset magnet, and including a contact switch operable by the carriage as it is restored to normal position for energizing momentarily first the solenoid of the film clamping device and then both magnets of said escapement unit.

35. In a photocomposing machine, the combination of an electric composing unit for producing a coded tape and equipped with a standard typewriter keyboard, a character width decoder responsive to character width signals in the coded tape, a justification storage unit responsive to justifying space signals in the coded tape, a gate relay whereby space information from said storage unit is transmitted to the decoder, and electrical means for quadding out lines which are of less than full length and which are therefore too short to be justified, said means including a quad relay, an auxiliary finger key operable to energize the quad relay and prevent the transmission of space information from the justification storage unit to the decoder, and a non-justifying minimum space relay controlled by the quad relay to set up a minimum space signal which is sent to the decoder when the gate relay is closed.

36. A combination according to claim 35, including an end-of-line relay which advances the tape after the composition of each line, and wherein said relay is energized by the quad relay in order that it may perform its normal functions when the auxiliary finger key is operated.

37. A combination according to claim 35 including an end-of-line finger key, a recording and releasing unit for the code assignments to said key, and an end-of-line amplifier relay arranged to receive an end-of-line signal from the recording and releasing unit for sending out an electrical impulse to reset the non-justifying space relay.

38. In or for a photocomposing machine, a composing unit for producing a coded tape and comprising, in combination, a keyboard, a coding unit comprising two groups of code elements, those of the first group acting in response to key actuation for producing character identification signals in the tape, and those of the second group acting in response to the same key actuation for producing corresponding character width signals in the tape, the code elements of the second group being adjustable to different operative positions in relation to the finger keys of the keyboard to vary the values of the character width signals for as many different sets of characters which vary in set width as between the sets, and selecting means for effecting such adjustment of the code elements according to the set of characters to be composed.

39. A composing unit according to claim 38, wherein the code elements of the second group are in the form of notched bars arranged below and extending transversely of the finger keys of the keyboard, and wherein said bars are shiftable longitudinally by the adjusting means to present different code portions in engaging relation to the finger keys.

40. A composing unit according to claim 38, wherein the code elements of the second group occupy a normal code position devoted to "lower case" characters and are adjustable to a plurality of other positions devoted to other sets of characters.

41. A composing unit according to claim 38, including means additional to the finger keys for producing character identification signals in the coded tape, said additional means being controlled by the selecting means which effect the adjustment of the character width code elements comprising the second group.

42. In a photocomposing machine, the combination of an electric composing unit and mechanism associated therewith for indicating the length of a composed line, said mechanism including automatic means controlled by the actuation of a special finger key after a line is completely composed for measuring the proper justifying space that must be added to the composed line to bring it to the desired length, together with a justification computer and storage unit responsive to said measuring means for computing and storing said justifying space information for use in photographing a justified line, characterized in that said automatic measuring means includes two transparent lined grids, one stationary and the other movable relatively thereto when the special finger key is actuated, a lamp located at one side of the grids, and a photoelectric cell located at the opposite side of the grids, whereby the measuring of the justifying space is accomplished by a series of electrical impulses induced in the cell and which will vary in number according to the length of the line composed.

43. A combination according to claim 42, wherein the justification computer includes electrical means for totalizing the number of minimum word spaces in a composed line, and separate electrical means whereby the number of impulses emanating from the photo-electric cell first are divided by the total of word spaces in a composed line and the quotient then transmitted to the justification storage unit.

44. In a photocomposing machine operated under control of a coded tape, the combination with a stationary font plate having an array of typographical characters, intermittently operated means responsive to character identification signals in the tape for selecting different ones of said characters to the exclusion of the others, a photographic film, and an optical system for projecting the images of the selected characters along the optical axis of the optical system and on to the film; of a carriage for advancing the film intermittently across said optical axis, a spring for propelling the carriage in its film advancing movement, and automatic means, responsive to character width signals in the tape associated with the character identification signals, for varying such intermittent movement of the carriage according to the varying set widths of the selected characters to be photographed, said automatic means including a pivoted lever or sine bar for sustaining the carriage against tension of its spring during its intermittent advance, and operable to restore the carriage to normal position after all characters of a line have been photographed, and power driven means for operating said lever.

45. A combination according to claim 44, including an electro-magnetic escapement device for controlling the advance movements of the carriage through the medium of the pivoted lever and the power driven operating means therefor.

46. A combination according to claim 44, wherein the sine bar is capable of longitudinal as well as pivotal movement during its operation, and wherein the pivotal axis of said bar is capable of adjustment relatively thereto as desired to vary the intermittent advance movement of the carriage according to the point size of the character font in use.

47. In a photocomposing machine, the combination of a film carriage for advancing the film intermittently to expose the individual characters of a composed line, a spring for propelling the carriage in its film advancing movement, a vertically disposed lever or sine bar for sustaining the carriage during its advance, a relatively fixed fulcrum stud for said lever engaging a longitudinal slot therein and arranged between the ends of said lever, a horizontally movable supporting slide to which the lower extremity of the lever is hingedly attached, and tape controlled means for indexing the advance movements of the carriage through the medium of said hinged lever, the aforesaid pivot stud for said lever being capable of adjustment to vary the displacements of the film carriage according to the point size of the characters to be photographed.

48. In a photocomposing machine, the combination of a film carriage for advancing the film intermittently to expose the individual characters of a composed line, a spring for propelling the carriage in its film advancing movement, a vertically disposed lever or sine bar for sustaining the carriage during its advance, a relatively fixed fulcrum stud for said lever engaging a longitudinal slot therein and arranged between the ends of said lever, a horizontally movable supporting slide to which the lower extremity of the lever is hingedly attached, and tape controlled means for indexing the advance movements of the carriage through the medium of said hinged lever, characterized in that the intermittent advance of the carriage is effected by two spring drums, one connected through a cable directly to the carriage and the other connected to the supporting slide for the carriage sustaining lever.

*49. In or for a photocomposing machine, a composing unit for producing a coded tape representative of a composed line of type characters which vary in set width on a units-of-an-em basis, and comprising, in combination, a keyboard, a character identification code mechanism acting in response to key actuation for producing character identification signals in the tape, and a character width code mechanism acting in response to the same key actuation for producing corresponding character width signals in the tape, said character width code mechanism including a plurality of groups of code elements having different character width values as between groups, the different groups of character width code elements representing different type fonts and the code elements in each group representing the set width values of the type characters in the corresponding font, together with means for selecting one or another of the groups of character width code elements according to the font of type characters to be composed.*

*50. A composing unit according to claim 49, wherein the selecting means include a function key which produces in the tape a signal representing the group of character width code elements selected.*

*51. A composing unit according to claim 50, wherein the function key is a font selecting key which produces in the tape a font signal representing the group of character width code elements selected.*

*52. In or for a photocomposing machine, a composing unit for producing a coded tape representative of a composed line of type characters which vary in set width on a units-of-an-em basis, and comprising, in combination, a keyboard, a character identification code mechanism acting in response to key actuation for producing character identification signals in the tape, an automatic computer mechanism acting in response to the same key actuation for computing the total number of units represented by the set widths of the characters and spaces in the composed line, and an indicator mechanism actuated by said automatic computer mechanism to indicate the length of the composed line, said automatic computer mechanism including a plurality of groups of code elements having different character width values as between groups, the different groups of character width code elements representing different type fonts and the code elements in each group representing the set width values of the type characters in the corresponding font, and means for selecting one or another of the groups of character width code elements according to the font of type characters to be composed.*

References Cited in the file of this patent or the original patent

UNITED STATES PATENTS

| | | |
|---|---|---|
| 1,603,953 | Hunter | Oct. 19, 1926 |
| 1,694,631 | Trojani | Dec. 11, 1928 |
| 1,732,049 | Hunter | Oct. 15, 1929 |
| 2,026,330 | Tauschek | Dec. 31, 1935 |
| 2,158,039 | Wenczler | May 9, 1939 |
| 2,178,379 | Spievak | Oct. 31, 1939 |
| 2,207,265 | Ogden | July 9, 1940 |
| 2,207,266 | Ogden | July 9, 1940 |
| 2,298,608 | Bates | Oct. 13, 1942 |
| 2,351,126 | Highton | June 13, 1944 |
| 2,359,617 | Bryce | Oct. 3, 1944 |
| 2,379,862 | Bush | July 10, 1945 |
| 2,441,899 | Ogden | May 18, 1948 |
| 2,549,071 | Dusek | Apr. 17, 1951 |
| 2,600,168 | Klyce | June 10, 1952 |
| 2,682,814 | Higonnet | July 6, 1954 |
| 2,714,842 | Hooven | Aug. 9, 1955 |
| 2,714,843 | Hooven | Aug. 9, 1955 |
| 2,725,803 | Tansel | Dec. 6, 1955 |